US010600053B2

(12) United States Patent
Bhagat et al.

(10) Patent No.: US 10,600,053 B2
(45) Date of Patent: Mar. 24, 2020

(54) METHOD AND SYSTEM FOR CREDITS IN A SOCIAL NETWORK

(71) Applicant: MasterCard International Incorporated, Purchase, NY (US)

(72) Inventors: Deepankar Bhagat, Chesterfield, MO (US); Derek Ryan Reed, Wright City, MO (US); Jill Boyd Bugh, Town and Country, MO (US); Mark N. Savoye, Hartsdale, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 706 days.

(21) Appl. No.: 15/239,184

(22) Filed: Aug. 17, 2016

(65) Prior Publication Data

US 2017/0053286 A1 Feb. 23, 2017

Related U.S. Application Data

(60) Provisional application No. 62/207,511, filed on Aug. 20, 2015.

(51) Int. Cl.
*G06Q 40/00* (2012.01)
*G06Q 20/40* (2012.01)
(Continued)

(52) U.S. Cl.
CPC ....... *G06Q 20/40145* (2013.01); *G06Q 20/40* (2013.01); *G06Q 50/01* (2013.01); *H04W 12/06* (2013.01); *H04L 2463/102* (2013.01)

(58) Field of Classification Search
CPC .............................................. G06Q 20/40145
(Continued)

(56) References Cited

U.S. PATENT DOCUMENTS

| 6,636,833 B1 | 10/2003 | Flitcroft et al. |
| 7,136,835 B1 | 11/2006 | Flitcroft et al. |

(Continued)

FOREIGN PATENT DOCUMENTS

| WO | 2013186931 A1 | 12/2013 |
| WO | 2014178121 A1 | 11/2014 |

OTHER PUBLICATIONS

International Search Report and Written Opinion issued by the International Search Authority dated Nov. 22, 2016 in corresponding PCT Application No. PCT/US2016/047241 (7 pages).

(Continued)

*Primary Examiner* — Samica L Norman
(74) *Attorney, Agent, or Firm* — Buchanan Ingersoll & Rooney PC

(57) ABSTRACT

A method for verification of user identity includes: storing account profiles, each profile including data related to a user account of a non-financial institution (NFI) entity including an account identifier and an address; receiving a transaction request, the request including a specific account identifier and a transaction amount; identifying an account profile including the specific account identifier; generating a controlled payment number associated with a transaction account of the NFI entity; transmitting a notification to a third party entity including the specific account identifier; transmitting the controlled payment number to a user associated with the user account related to the specific account profile; receiving a data message from the third party entity including the specific account identifier and identification data associated with the user; and updating the specific account profile to include the controlled payment number, the identification data, and a spending limit based on the transaction amount.

16 Claims, 15 Drawing Sheets

(51) Int. Cl.
*G06Q 50/00* (2012.01)
*H04W 12/06* (2009.01)

(58) Field of Classification Search
USPC .................................................. 705/44, 71
See application file for complete search history.

(56) References Cited

U.S. PATENT DOCUMENTS

| | | |
|---|---|---|
| 7,567,934 B2 | 7/2009 | Flitcroft et al. |
| 7,571,142 B1 | 8/2009 | Flitcroft et al. |
| 7,593,896 B1 | 9/2009 | Flitcroft et al. |
| 8,423,459 B1 | 4/2013 | Green et al. |
| 8,676,707 B2 | 3/2014 | Flitcroft et al. |
| 8,756,150 B2 | 6/2014 | Flitcroft et al. |
| 2001/0039535 A1* | 11/2001 | Tsiounis ............. G06Q 20/02 705/71 |
| 2009/0070260 A1 | 3/2009 | Flitcroft et al. |

OTHER PUBLICATIONS

Extended European Search Report dated Dec. 4, 2018, by the European Patent Office in corresponding European Patent Application No. 16837715.8-1222. (8 pages).

* cited by examiner

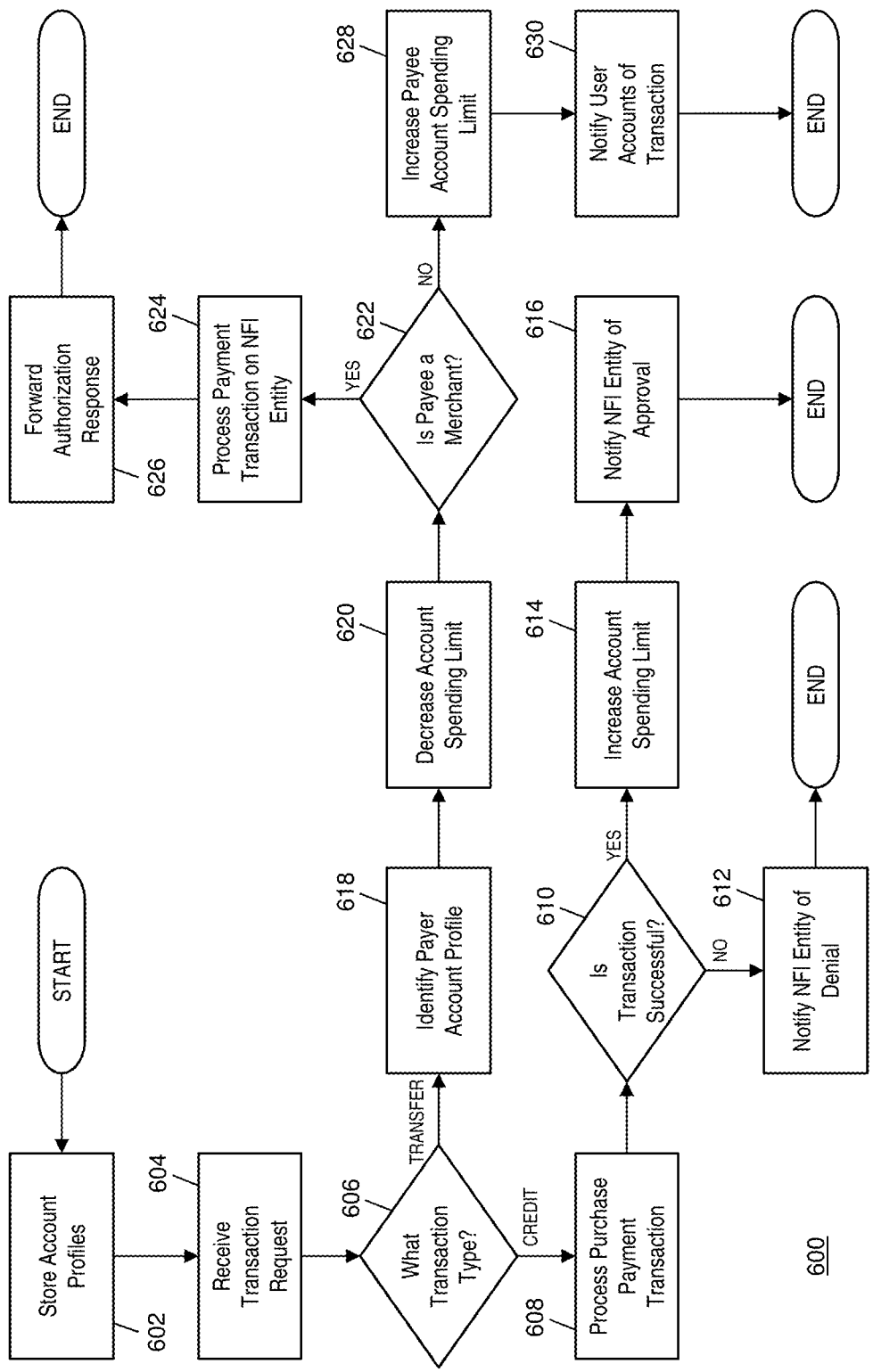

METHOD AND SYSTEM FOR CREDITS IN A SOCIAL NETWORK

FIELD

The present disclosure relates to the crediting of user accounts and processing of transactions involving user accounts, specifically associating controlled payment numbers with user accounts of a non-financial institution entity, verification of user identities, and use thereof in person to person transactions.

BACKGROUND

Non-financial institution (NFI) entities, particularly those with a heavy presence on the Internet and other types of communication networks that involve computing devices, may be associated with a significant number of users. Each of these users may have an account with the NFI entity, which may be used to engage in various services offered by the entity. For example, a social network may have users numbering in the hundreds of thousands, if not millions, and may provide the users with various tools for connecting with others, interacting socially, etc.

As part of the services provided to users, NFI entities may sometimes interact with, or provide for an avenue for users to interact with, a third party. For example, the NFI entity may make a deal with a merchant to offer discounts to the entity's users, which may be of mutual benefit to the NFI entity, the merchant, and the users that enjoy the discount. However, it may be difficult and cumbersome for a merchant to verify that a customer is a user of the NFI entity and eligible for a discount, which may dissuade both the merchant and users from taking advantage of the deal, thereby negating any benefit attempted by the NFI entity.

Some methods for providing users with such a service may involve collecting user payment information, and enabling the user to conduct transactions via the NFI entity. However, users may be wary of providing such sensitive data to the NFI entity. In addition, many NFI entities may lack the technical hardware and system security necessary to both store such information and communicate such information, which may require specialized protocols and communication technology. Another method may involve the establishing of payment accounts with the NFI entity, using a traditional fiat currency or a specialized currency. However, this may require the entity to operate as a financial entity and regularly process payment transactions, which may be costly and require the entity to significantly modify their technical systems, business practices, licensing, etc.

Thus, there is a need for a technical system that can provide an NFI entity with the ability to enable users to conduct payment transactions, particularly person to person transactions, but without requiring the NFI entity to operate as a financial institution or to regularly conduct transactions using traditional payment systems. Some NFI entities have established virtual currencies in order to enable transactions among users. However, these currencies often may be unable to be used outside of the NFI entity, which may be limiting for users, and has historically resulted in low adoption and usage by users. Thus, there is a need for not only enabling users to conduct user to user transactions, but also to enable users to conduct transactions with outside entities, but without requiring the NFI entity to operate as a financial institution.

In addition, in some instances it may be beneficial, or in some jurisdictions even required, to verify a user that is to conduct transactions with outside entities. Limitations in existing NFI entity systems prevent NFIs from verifying the identity of a user to whom currency is provided for use in transactions with outside entities. As such, there is also a need for a technical solution where the identity of a user that conducts user to user and outside entity transactions can be verified.

SUMMARY

The present disclosure provides a description of systems and methods for verification of user identities.

A method for verification of user identity includes: storing, in an account database, a plurality of account profiles, each account profile including data related to a user account of a non-financial institution (NFI) entity, said data including at least an account identifier and an address; receiving, by a receiving device, a transaction request, wherein the transaction request includes at least a specific account identifier and a transaction amount; identifying, by a processing device, an account profile stored in the account database where the included account identifier corresponds to the specific account identifier; generating, by the processing device, a controlled payment number, wherein the controlled payment number is associated with a transaction account of the NFI entity; transmitting, by a transmitting device, a notification to a third party entity, wherein the notification includes at least the specific account identifier; transmitting, by the transmitting device, the generated controlled payment number for distribution to a user associated with the user account related to the specific account profile; receiving, by the receiving device, a data message from the third party entity, wherein the data message includes at least the specific account identifier and identification data associated with the user; and updating, by the processing device, the specific account profile in the account database to include at least the generated controlled payment number, the identification data, and a spending limit, wherein the spending limit is based on the transaction amount and where payment transactions involving the controlled payment number are subject to the spending limit.

A system for verification of user identity includes an account database, a receiving device, a processing device, and a transmitting device. The account database is configured to store a plurality of account profiles, each account profile including data related to a user account of a non-financial institution (NFI) entity, said data including at least an account identifier and an address. The receiving device is configured to receive a transaction request, wherein the transaction request includes at least a specific account identifier and a transaction amount. The processing device is configured to: identify an account profile stored in the account database where the included account identifier corresponds to the specific account identifier; and generate a controlled payment number, wherein the controlled payment number is associated with a transaction account of the NFI entity. The transmitting device is configured to transmit: a notification to a third party entity, wherein the notification includes at least the specific account identifier; and the generated controlled payment number for distribution to a user associated with the user account related to the specific account profile. The receiving device is further configured to receive a data message from the third party entity, wherein the data message includes at least the specific account identifier and identification data associated with the user. The processing device is further configured to update the specific account profile in the account database to include at least the generated controlled payment number, the identification data, and a spending limit, wherein the spending limit is based on the transaction amount and where payment transactions involving the controlled payment number are subject to the spending limit.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 6 is a flow diagram illustrating the processing of transactions using the processing server of FIG. 2 in accordance with exemplary embodiments.

Figure 1:
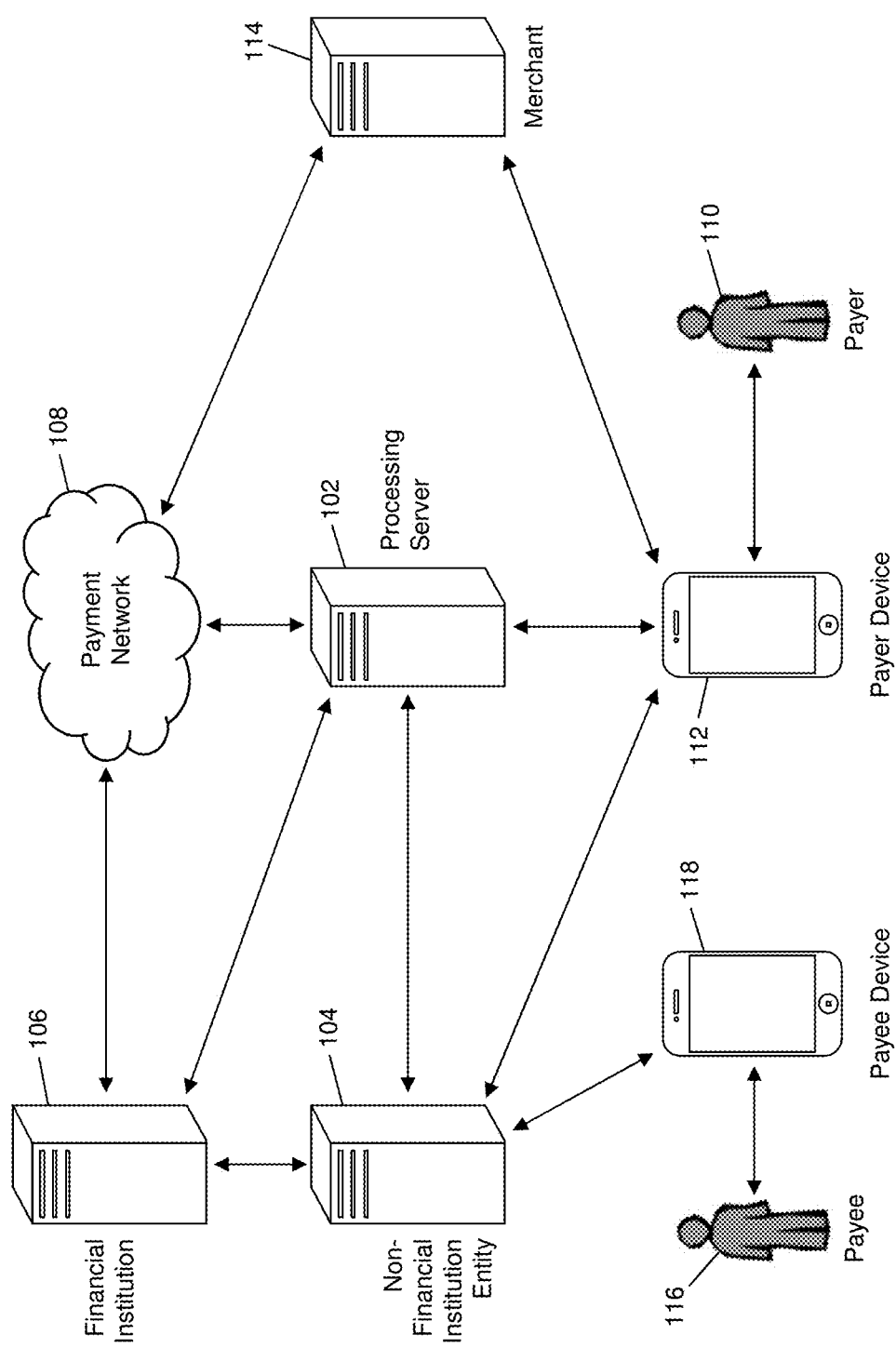
FIG. 1 is a block diagram illustrating a high level system architecture for processing transactions involving user accounts with a non-financial institution entity using controlled payment numbers in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require and special knowledge in offered products. In some embodiments, an entity involved in a single transaction may be considered a merchant.

Controlled Payment Number—Controlled payment numbers may be payment numbers associated with a payment account that are subject to one or more rules. In many cases, these rules may be set by a cardholder, such as spending limits, limits on days and/or times of a transaction, limits on merchants or industries, transaction spending or frequency limits, etc. Controlled payment numbers may offer an account holder an opportunity to give payment cards tied to the account to others for use, but subject to rules set by the cardholder, such as an employer distributing cards to employees, or a parent distributing cards to children. Additional detail regarding controlled payment numbers may be found in U.S. Pat. No. 6,636,833, issued Oct. 21, 2003; U.S. Pat. No. 7,136,835, issued Nov. 14, 2006; U.S. Pat. No. 7,571,142, issued Aug. 4, 2009; U.S. Pat. No. 7,567,934, issued Jul. 28, 2009; U.S. Pat. No. 7,593,896, issued Sep. 22, 2009; U.S. patent application Ser. No. 12/219,952, filed Jul. 30, 2008; U.S. patent application Ser. No. 12/268,063, filed Nov. 10, 2008; and U.S. patent application Ser. No. 12/359,971, filed Jan. 26, 2009; each of which is herein incorporated by reference in its entirety.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

System for Processing Transactions with User Accounts

FIG. 1 illustrates a system 100 for the crediting of user accounts and use thereof in user-to-merchant and user-to-user payment transactions via the use of controlled payment numbers for users of a non-financial institution entity.

The system 100 may include a processing server 102. The processing server 102, discussed in more detail below, may be configured to credit user accounts, assist in the processing of transactions involving user accounts, manage user accounts, and otherwise provide for assistance with associations between user accounts and controlled payment numbers for users of a non-financial institution (NFI) entity 104 using the methods discussed herein. The NFI entity 104 may be, for example, a social network, a gaming platform, an entertainment website, a news service, or any other entity that may not be a financial institution, but may have users that may benefit from being involved in payment transactions.

The NFI entity 104 may have a transaction account established with a financial institution 106. The financial institution 106 may be, for instance, an issuing bank, or other suitable type of financial institution configured to establish and operate transaction accounts. The transaction account associated with the NFI entity 104 may be used by the NFI entity 104 to conduct payment transactions using traditional methods and systems. Payment transactions involving the NFI entity 104 may be conducted via a payment network 108 using traditional methods and systems.

The financial institution 106, payment network 108, and/or processing server 102 may be configured to provide the NFI entity 104 with controlled payment number (CPNs) associated with their transaction account. CPNs may be subject to one or more limits set forth by the NFI entity 104 and/or financial institution 106, but, when used, may draw on the associated transaction account. Each CPN may have a different number that may be different from the primary account number associated with the transaction account that, when used in a transaction, may trigger the checking of the transaction against limits set on the CPN. For instance, a CPN may be established that has a spending limit of $50 per transaction. When the CPN is used in a transaction, the payment network 108 may identify that a CPN is used, identify its associated limits, and may evaluate limits as applied to the transaction. If the transaction is within the $50 limit, it may be processed, with payment being drawn from the associated transaction account. If the transaction exceeds the $50 limit, it may be declined, and the NFI entity 104 and/or financial institution 106 may be identified.

The processing server 102 may be configured to provide the NFI entity 104 with CPNs for users of the NFI entity 104. The processing server 102 may be configured to communicate with the payment network 108 and/or financial institution 106 to request issuance of new CPNs and to adjust spending limits on CPNs using methods and systems that will be apparent to persons having skill in the relevant art. In some instances, the processing server 102 may be a part of the payment network 108 or financial institution 106 and may manage CPNs through internal communications as applicable. In some cases, the processing server 102 may be a part of the NFI entity 104.

In the system 100, a payer 110 may be a user of the NFI entity 104. The payer 110 may communicate with the NFI entity 104 via a payer device 112. The payer device 112 may be any suitable type of computing device, such as a desktop computer, laptop computer, notebook computer, tablet computer, cellular phone, smart phone, smart watch, smart television, wearable computing device, implantable computing device, etc. The payer 110 may use the payer device 112 to register as a user of the NFI entity 104, such as by signing up for services offered by the NFI entity 104 via a webpage, application program, etc. For example, if the NFI entity 104 is a social network, the payer 110 may use an application program associated with the social network on the payer device 112 to register as a user of the social network and access the services provided thereby.

As one of the services, the NFI entity 104 may provide the payer 110 with the ability to conduct payment transactions using their user account. In order to conduct payment transactions, the payer 110 may first be required to buy currency to be associated with their user account. Using the payer device 112, the payer 110 may initiate a payment transaction for the purchase of currency from the NFI entity 104. Details for the payment transaction may be provided to the processing server 102. The processing server 102 may identify that the transaction is for the purchase of currency based on data included in the transaction details. For example, the transaction details may include an indication that the transaction is for the purchase of currency, such as a data value indicative of the type of transaction, or the inclusion of the account number associated with the NFI entity's transaction account, which may be used only in the purchase of currency, for example.

The processing server 102 may identify a user account associated with the payer 110. In some instances, the payer 110 may provide their account information, such as an account identifier, as part of the transaction process. In other instances, the NFI entity 104 may provide the payer's account information during the submission of the transaction data, such as included in a data element of a transaction message or in a separate, accompanying message. The processing server 102 may identify a CPN associated with the user account of the payer 110. If the payer 110 is not already associated with a CPN, the processing server 102 may request a CPN be issued by the payment network 108 or financial institution 106 as applicable. The CPN may be issued with a spending limit corresponding to the amount of currency being purchased by the payer 110. In instances where the payer 110 already has a CPN associated thereto, the processing server 102 may request that the spending limit of the CPN be increased based on the amount of currency being purchased. The result is that the payer 110 may have a CPN that is associated with the NFI entity's transaction account that has a spending limit commiserate with the amount of currency purchased by the payer 110.

The spending limit of CPNs associated with users may represent currency available for spending by users of the NFI entity 104. In some instances, the actual spending limit may be represented to users directly. For example, if a user is associated with a CPN with a spending limit of $100, the user's account may reflect a balance of $100. In other instances, an alternative currency may be used, such as a different fiat currency, a virtual, non-fiat currency, a cryptocurrency, etc. For example, the NFI entity 104 may have a transaction account that is established in U.S. dollars, and thus a user may have a spending limit of $100, but may be represented to the user as the equivalent amount in a different currency, such as one local to the user, such as in Euros. In another example, the NFI entity 104 may establish a currency unique to the NFI entity, such as "credits," and may represent a user's spending limit in an equivalent amount of credits based on their spending limit. For instance, if the NFI entity 104 establishes that 100 credits is equivalent to $1, a user with a $100 spending limit may have their account reflect a balance of 10,000 credits.

Users of the NFI entity 104 may be able to use their user account in conducting payment transactions with third parties, such as an outside merchant 114. The payer 110 may initiate a payment transaction with a merchant 114 for the purchase of goods or services and may present their CPN associated with their user account for payment. In some instances, the transaction may be an e-commerce transaction, with the CPN provided to the merchant 114 electronically. In other instances, the payer 110 may be issued a physical card encoded with payment credentials associated with the CPN, which may be presented to the merchant 114 similar to a traditional payment card. The merchant 114 may then process the payment transaction using the CPN. A transaction message may be submitted to the payment network 108 that includes the CPN as the primary account number used to fund the transaction. The payment network 108 may then process the transaction using traditional methods and systems for processing of transactions involving CPNs.

The processing server 102 may adjust the spending limit of the payer's CPN as a result of the transaction with the merchant 114. For example, if the payer 110 spends $50 at the merchant 114, the processing server 102 may request the financial institution 106 or payment network 108 to reduce the spending limit of the CPN by $50. The resulting spending limit may be reflected in the user's account when accessing the NFI entity 104, showing their reduced balance. Thus, users of the NFI entity 104 may be able to conduct payment transactions with outside merchants 114 using their user account, without requiring the NFI entity 104 to operate as a financial institution, and without the NFI entity 104 possessing or obtaining any payment information from users. Instead, CPNs are issued on the transaction account of the NFI entity 104, with their spending limit indicated to the user as being an available balance.

User CPNs may also be advantageous for use in the conducting of user-to-user transactions for users of the NFI entity 104. The payer 110 may conduct a payment transaction to make a payment to the payee 116 with the payee 116 using a payee device 118. Like the payer device 112, the payee device 118 may be any suitable type of computing device, such as a desktop computer, laptop computer, notebook computer, tablet computer, cellular phone, smart phone, smart watch, smart television, wearable computing device, implantable computing device, etc. Traditionally, a person-to-person payment transaction may require the submission of a transaction message to the payment network 108 that includes payment credentials for a transaction account associated with each of the payer 110 and the payee 116. Such transaction processing often involves specific technical hardware configured to generate transaction messages, which are often specially formatted, and to communicate with payment networks 108, which involves specialized communication paths and protocols. However, many payers 110, payees 116, and NFI entities 104 may lack the technical hardware able to perform such processes.

Using the system 100, in order to make a payment from the payer 110 to the payee 116, the payer 110 may use their user account via the payer device 112 to initiate a transaction for the payment of currency to the payee 116 via the NFI entity 104. The NFI entity 104 may receive the transaction request and may forward the transaction request to the processing server 102. The processing server 102 may submit a request to the financial institution 106 or payment network 108 as applicable to increase the spending limit for the CPN associated with the payee 116 by the transaction amount, and decrease the spending limit for the CPN associated with the payer 110 by the transaction amount.

As a result, the payer 110 and payee 116 may participate in a user-to-user transaction where the available spending for each of the users has been adjusted accordingly, but without requiring the processing of a payment transaction using the payment network 108. By using CPNs and adjusting their spending limits to represent a transaction, the NFI entity 104 may provide for user-to-user payments without requiring the NFI entity 104 or user devices to be modified to generate transaction message or configured to use specialized communication protocols to perform communications with the payment network 108. Thus, the processing server 102 may provide for significant technical advantages over traditional systems by enabling the NFI entity 104 to provide users with user-to-user payment transactions without requiring processing by traditional payment networks 108, while still enabling users to conduct payment transactions with outside merchants 114 using the same accounts.

In some embodiments, the processing server 102 may also be configured to verify the identity of a payer 110 or payee 116. For example, in instances where a payee 116 may be a user of the NFI entity 104 without a known transaction account, the identity of the payee 116 may be verified prior to the payee 116 being provided access to the funds (e.g., before the spending limit is increased or the user CPN is provided to the payee 116). For instance, some jurisdictions may require that a recipient of a payment instrument is identified prior to issuance of that payment instrument to the recipient. In such instances, the processing server 102 may verify the identity of the payee 116 rather than providing the CPN to the payee 116 or for enabling the CPN for usage in transactions involving merchants 114 or other entities outside of user-to-user transactions via the NFI entity 104. For example, the payee 116 may be able to transact with the payer 110 using credits, but may be unable to use their CPN in transactions at merchants 114 prior to providing identification data.

In some embodiments, the processing server 102 may utilize a third party to gather identification data for the payee 116. For example, when a transaction request is received by the processing server 102, the processing server 102 may identify the user account for the payee 116 at the NFI entity 104 and may provide data indicative of the user account (e.g., an account identifier) to a third party. The third party may then contact the payee 116 and may request identification from the payee 116. The third party may return the identification data to the processing server 102. Once the identification data is received, it may be stored in a profile associated with the payee 116, and then the spending limit for the CPN associated with the payee's user account may be increased and/or the CPN may be provided to the payee 116 for use.

In some embodiments, the third party may be identified for use in collecting identification of the payee 116 based on a geographic location of the payee 116. For example, the third party may be a financial institution, such as the financial institution 106, that includes one or more branches or services that operate in proximity to the payee 116, such as in a city associated with the payee's user account with the NFI entity 104. In some instances, the payee 116 may indicate on or more third parties the payee 116 may be willing to interact with to provide identification data. For example, when the payee 116 is sent funds by a payer 110, the processing server 102 (e.g., directly to the payee device 118 or via the NFI entity 104) may notify the payee 116 of the transfer and the necessity to provide identification. The payee 116 may then (e.g., using the payee device 118) select one or more third party entities and/or methods for providing identification data to the processing server 102.

In some cases, the processing server 102 may generate or otherwise identify a CPN for the payee 116 and may provide the CPN to the payee 116 in conjunction with the collection of identification data. For example, the third party entity may be a mail delivery service that may deliver a physical payment card encoded with the CPN to the payee 116 and collect identification data in exchange for the payment card. In such an example, the payment card may be sent in a package requiring the payee 116 to present a government-issued identification card and a signature to accept the package. The third party entity may then provide the identification card and signature or data associated therewith to the processing server 102 for association with the payee's user account. Upon receipt of the identification data, the spending limit for the CPN may be increased based on the funds paid to the payee 116, and the processing server 102 may inform the payee 116 that their new funds are available for use via the payment card. Other third party entities may include, for example, government agencies, credit bureaus, identity services, law enforcement agencies, etc. Identification data may include name, identification number, date of birth, age, gender, signature, image, biometric data, or any other suitable identification data such as may be required by rules or regulations or suitable for use in performing the functions discussed herein.

In some embodiments, the processing server 102 may be configured to provide the identification data to the financial institution 106 or another entity for additional verification. For example, the financial institution 106 may perform further verification of the identification data provided by the payee 116, such as to ensure that the identification data is genuine and/or to verify that the payee 116 is who they purport to be. For instance, the financial institution 106 may check an identification number provided by the payee 116 with a name and date of birth provided by the payee 116 to ensure that the information matches. In such embodiments, the financial institution 106 or other entity may transmit a notification to the processing server 102 that indicates if the payee 116 was successfully verified or not. In some cases, the processing server 102 may wait to receive a notification from the financial institution 106 that the payee 116 was successfully verified prior to increasing the spending limit for the CPN or otherwise making the CPN available for use by the payee 116.

Processing Server

Figure 2:
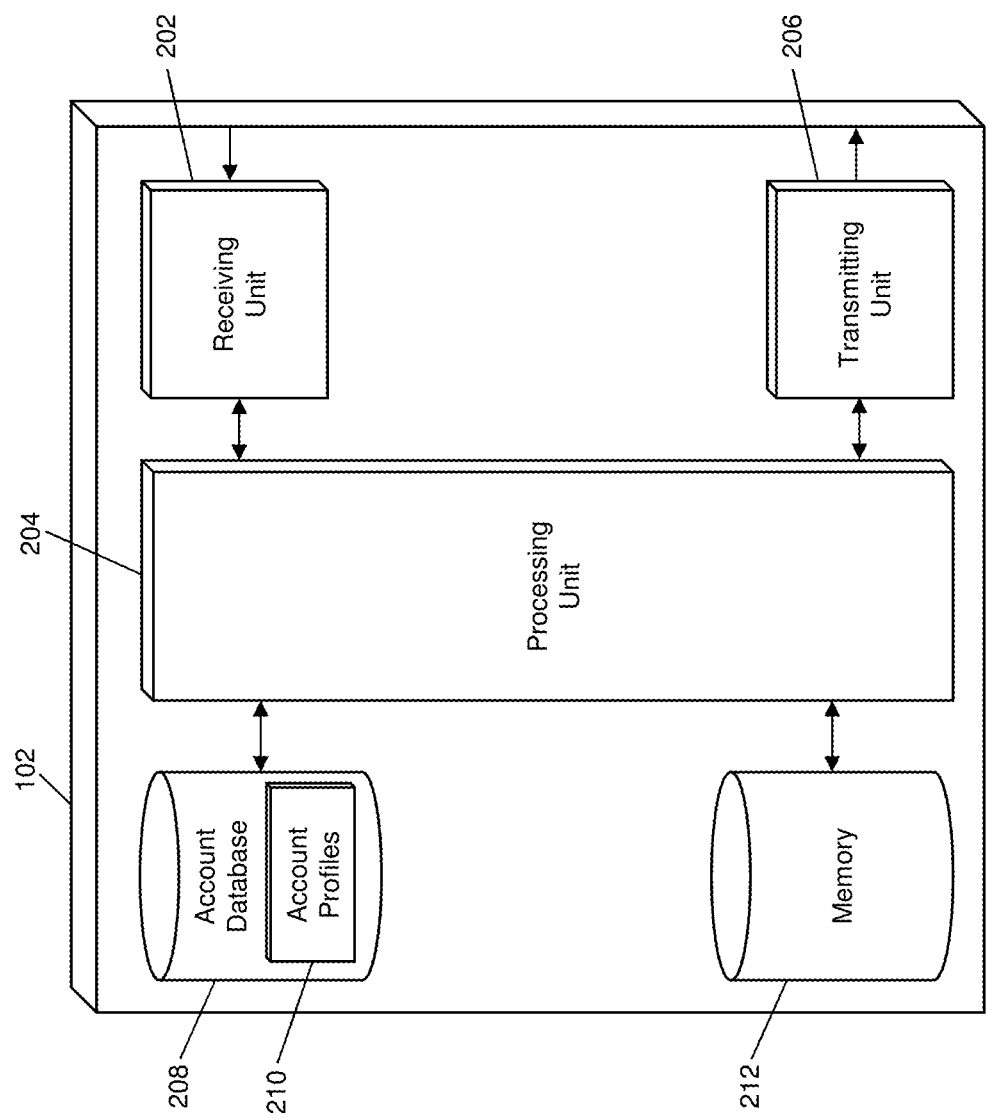
FIG. 2 is a block diagram illustrating the processing server of FIG. 1 for crediting user accounts and processing transactions involving user accounts in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 900 illustrated in FIG. 9 and discussed in more detail below may be a suitable configuration of the processing server 102.

The processing server 102 may include a receiving unit 202. The receiving unit 202 may be configured to receive data over one or more networks via one or more network protocols. In some embodiments, the receiving unit 202 may be configured to receive data over the payment rails, such as using specially configured infrastructure associated with payment networks 108 for the transmission of transaction messages that include sensitive financial data and information. In some instances, the receiving unit 202 may also be configured to receive data from computing devices such as payer device 112 and payee device 118, NFI entities 104, financial institutions 106, and other entities via alternative networks, such as the Internet. In some embodiments, the receiving unit 202 may be comprised of multiple units, such as different receiving units for receiving data over different networks, such as a first receiving unit for receiving data over payment rails and a second receiving unit for receiving data over the Internet. The receiving unit 202 may receive data signals that are electronically transmitted, where data may be superimposed on the data signal and decoded, parsed, read, or otherwise obtained via receipt of the data signal by the receiving unit 202. In some instances, the receiving unit 202 may include a parsing module for parsing the received data signal to obtain the data superimposed thereon.

The receiving unit 202 may receive data communications from the NFI entity 104, payer device 112, payee device 118, etc., which may utilize the Internet, local area networks, or other suitable networks and associated protocols. The receiving unit 202 may also be configured to receive transaction messages. Transaction messages may be formatted pursuant to one or more standards, such as the International Organization for Standardization's ISO 8583 standard, and may include a plurality of data elements. Each data element in the transaction message may be configured to store data based on the associated standards. In some instances, transaction messages may also include additional data, such as message type indicators.

The processing server 102 may also include an account database 208. The account database 208 may be configured to store a plurality of account profiles 210 using a suitable data storage format and schema. The account database 208 may be a relational database that utilizes structured query language for the storage, identification, modification, updating, accessing, etc. of structured data sets sorted therein. Each account profile 210 may be a structured data set configured to store data related to a user account associated with the NFI entity 104. Each account profile 210 may include at least a CPN associated with the related user account and a spending limit for the CPN. The spending limit may be represented in the currency of the transaction account associated with the CPN, or may be represented in a different currency as established by the NFI entity 104. The spending limit may be such that transactions conducted involving the CPN may be subject to the spending limit, or an equivalent amount in a related fiat currency, and may not be conducted if the transaction amount exceeds the spending limit. The spending limit may be adjusted as a result of payment transactions, including user-to-merchant transactions, user-to-user transactions, and transactions involving the purchase of additional currency by the related user. In some instances, an account profile 210 may include an account identifier and an address, such as in instances where the related user account has not had the associated user identity verified. In such instances, a CPN may not be included in the account profile 210, or the account profile 210 may include a CPN that has not been provided to the related user or for which the spending limit is at zero or otherwise inaccessible.

The processing server 102 may also include a communication module. The communication module may be configured to transmit data between modules, engines, databases, memories, and other components of the processing server 102 for use in performing the functions discussed herein. The communication module may be comprised of one or more communication types and utilize various communication methods for communications within a computing device. For example, the communication module may be comprised of a bus, contact pin connectors, wires, etc. In some embodiments, the communication module may also be configured to communicate between internal components of the processing server and external components of the processing server 102, such as externally connected databases, display devices, input devices, etc.

The processing server 102 may further include a processing unit 204. The processing unit 204 may be configured to perform the functions of the processing server 102 as discussed herein as will be apparent to persons having skill in the relevant art. In some embodiments, the processing unit 204 may include and/or be comprised of a plurality of engines and/or modules specially configured to perform one or more functions of the processing unit 204. For example, the processing unit 204 may include a querying module configured to query databases, such as the account database 208, included in the processing server 102 to identify information stored therein. In some instances, the processing unit 204 may include a parsing module or engine configured to parse data from data signals electronically received by the receiving unit 202, an encryption module or engine configured to decrypt received data or data signals or to encrypt data or data signals received or transmitted by the processing server 102, and any other modules suitable for performing the functions discussed herein. The processing unit 204 may be configured to process transactions involving users of the NFI entity 104 based on transaction messages and transaction requests received by the receiving unit 202.

For example, if the receiving unit 202 receives a transaction message for the purchase of currency by a user, the processing unit 204 may be configured to initiate a payment transaction for payment from the user to the NFI entity's transaction account and for the increase and/or establishment of a spending limit for a CPN associated with the user based on the transaction amount. The transaction message may be forwarded to the payment network 108 for processing of payment from the user. In some instances, the processing unit 204 may generate a new transaction message for submission to the payment network 108 for payment from the user to the NFI entity 104.

The processing unit 204 may also generate a request to submit to the financial institution 106 or payment network 108 as applicable (e.g., depending on which entity may control usage of the CPN) to increase the spending limit of a CPN associated with the user. The CPN may be identified in the transaction message, or may be identified in a separate message provided by the user or the NFI entity 104. In some instances, an account identifier associated with the user account may be provided, which may be used by the processing unit 204 to identify an account profile 210 stored in the account database 208, which may be used to identify the CPN for which the spending limit is to be increased. In instances where a user may purchase currency without having a previously established CPN, the processing unit 204 may generate a request for issuance of a CPN for use by the user, with the spending limit being based on the transaction amount. In some cases, the spending limit may be adjusted by an amount different from the transaction amount, such as due to processing fees.

The processing unit 204 may be configured to identify such a transaction via data included in the received transaction message. For instance, a data element in the transaction message may be configured to store an indication that the transaction is for the purchase of currency. In another instance, if the payee account number included in a corresponding data element in the transaction message is an account number associated with the transaction account of the NFI entity 104 for which CPNs are to be associated, then the transaction may be indicative of one for the purchase of currency by a user.

In another example, the receiving unit 202 may receive a transaction message from a merchant 114 for a user-to-merchant transaction. In some instances, the receiving unit 202 may receive a copy of a transaction message used in a user-to-merchant transaction from the payment network 108. In yet another instance, the financial institution 106 and/or NFI entity 104 may provide the processing server 102 with data associated with a user-to-merchant transaction (e.g., which was drawn on the transaction account of the NFI entity 104 via a CPN). The processing unit 204 may be configured to submit a request to the financial institution 106 or payment network 108 as applicable to decrease the spending limit associated with the CPN used in the payment transaction.

In yet another example, the receiving unit 202 may receive a transaction request from a payer device 112, payee device 118, and/or NFI entity 104 for a user-to-user transaction. The processing unit 204 may generate a request for submission to the applicable entity to decrease the spending limit of the CPN associated with the payer 110 by the transaction amount, and a request for submission to increase the spending limit of the CPN associated with the payee 116 by the transaction amount.

The processing unit 204 may also be configured to verify a user identity for a user associated with a user account related to an account profile 210. For example, if the receiving unit 202 receives a transaction request to in a user-to-user transaction, the processing unit 204 may identify an account profile 210 associated with the payee 116 using an account identifier or a CPN included in the transaction request. The processing unit 204 may identify that the identity of the payee 116 has not been verified, such as based on an account flag, a lack of identification data, a lack of a CPN, an inaccessible spending limit, etc. The processing unit 204 may then initiate a process for verifying the identity of the payee 116 using the methods discussed herein, which may include providing the account identifier to a third party entity and receiving, by the receiving unit 202, identification data for the payee 116. The processing unit 204 can then update the account profile 210 to include the identification data. In some embodiments, the processing unit 204 may first await receipt (e.g., by the receiving unit 202) of a notification that the identification data has been successful verified, such as by the financial institution 106 or other entity.

The processing unit 204 may also be configured to perform any additional functions of the processing server 102 suitable for performing the methods and systems discussed herein. For example, the processing unit 204 may be configured to perform currency conversions, generate account alerts, generate notifications, etc.

The processing server 102 may also include a transmitting unit 206. The transmitting unit 206 may be configured to transmit data over one or more networks via one or more network protocols. In some embodiments, the transmitting unit 206 may be configured to transmit data over the payment rails, such as using specially configured infrastructure associated with payment networks 108 for the transmission of transaction messages that include sensitive financial data and information, such as identified payment credentials. In some instances, the transmitting unit 206 may be configured to transmit data to computing devices, such as payer device 112 and payee device 118, payment networks 108, NFI entities 104, financial institutions 106, and other entities via alternative networks, such as the Internet. In some embodiments, the transmitting unit 206 may be comprised of multiple units, such as different transmitting units for transmitting data over different networks, such as a first transmitting unit for transmitting data over the payment rails and a second transmitting unit for transmitting data over the Internet. The transmitting unit 206 may electronically transmit data signals that have data superimposed that may be parsed by a receiving computing device. In some instances, the transmitting unit 206 may include one or more modules for superimposing, encoding, or otherwise formatting data into data signals suitable for transmission.

The transmitting unit 206 may be configured to transmit transaction messages to the payment network 108 using associated communication protocols, may be configured to transmit data requests to the financial institution 106 and/or payment network 108 requesting issuance of CPNs and adjustments of spending limits for CPNs, may be configured to transmit notifications to the NFI entity 104 regarding transactions and CPN adjustments, may be configured to transmit notifications to payer devices 112 and payee devices 118 regarding transactions, etc. The transmitting unit 206 may also be configured to transmit CPNs to users (e.g., via payer and payee devices 112 and 118) or to third parties for use in issuing physical payment cards or other payment instruments to users and/or verification of user identities. The transmitting unit 206 may also transmit notifications to third parties that include account identifiers and other account information suitable for use in the verification of user identities. In such instances, the transmitting unit 206 may also be configured to transmit received identification data to financial institutions 106 and other entities for use in further verification of user identities.

The processing server 102 may further include a memory 212. The memory 212 may be configured to store data for the processing server 102 suitable for performing the functions disclosed herein. The memory 212 may be configured to store data using suitable data formatting methods and schema and may be any suitable type of memory, such as read-only memory, random access memory, etc. For example, the memory 212 may be configured to store data formatting rules and algorithms (e.g., associated with transaction messages standards), communication protocol data, currency exchange rates and algorithms, encryption keys and algorithms, program code for modules and application programs of the processing unit 204, etc. Additional data that may be stored in the memory 212 will be apparent to persons having skill in the relevant art. In some embodiments, the memory 212 may be comprised of or may otherwise include a relational database that utilizes structured query language for the storage, identification, modifying, updating, accessing, etc. of structured data sets stored therein.

Process for Crediting a User Account

Figure 3A:
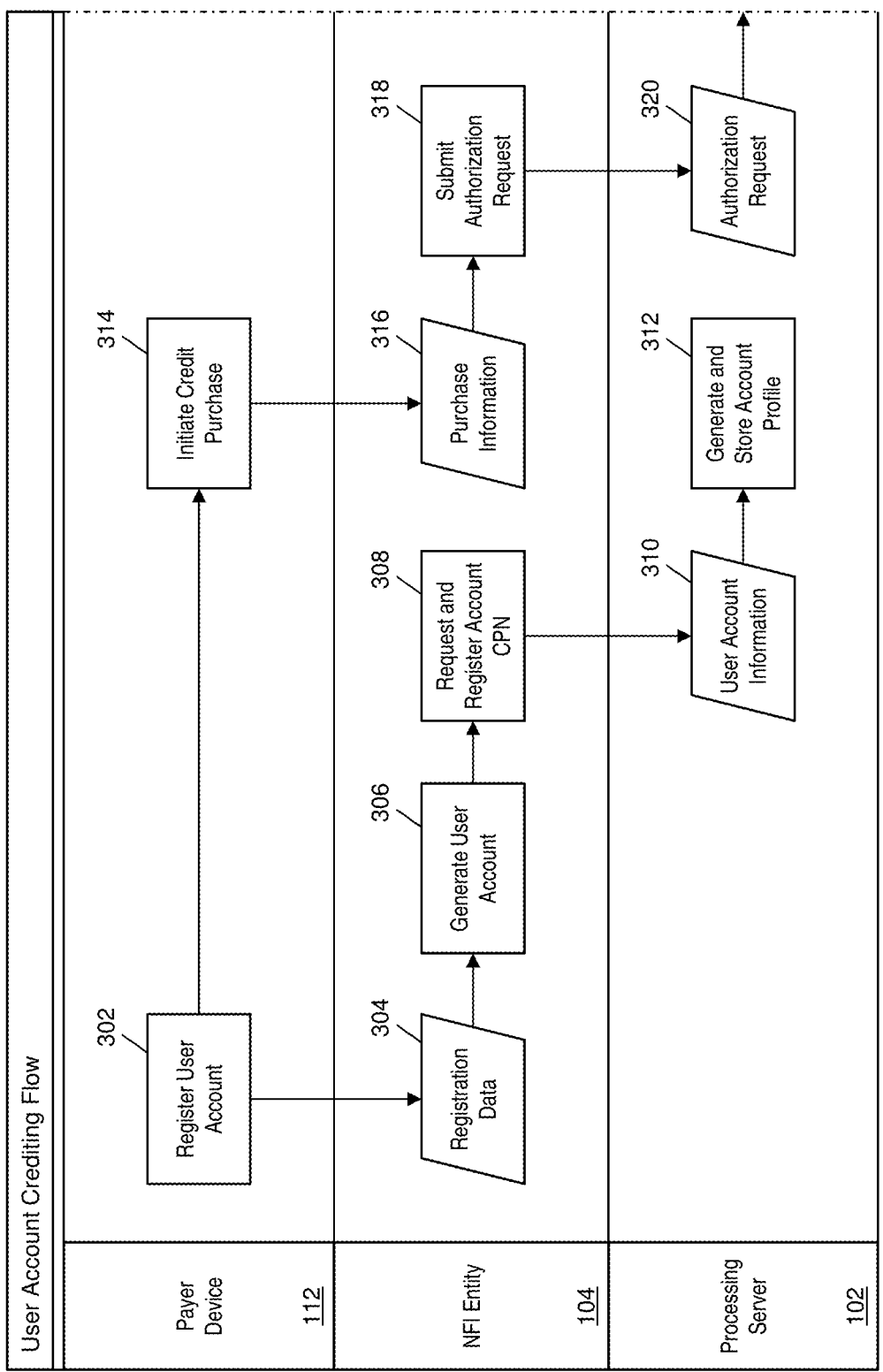
FIGS. 3A and 3B are a flow diagram illustrating a processing flow for the crediting of a user account associated with a controlled payment number in accordance with exemplary embodiments.
Figure 3B:
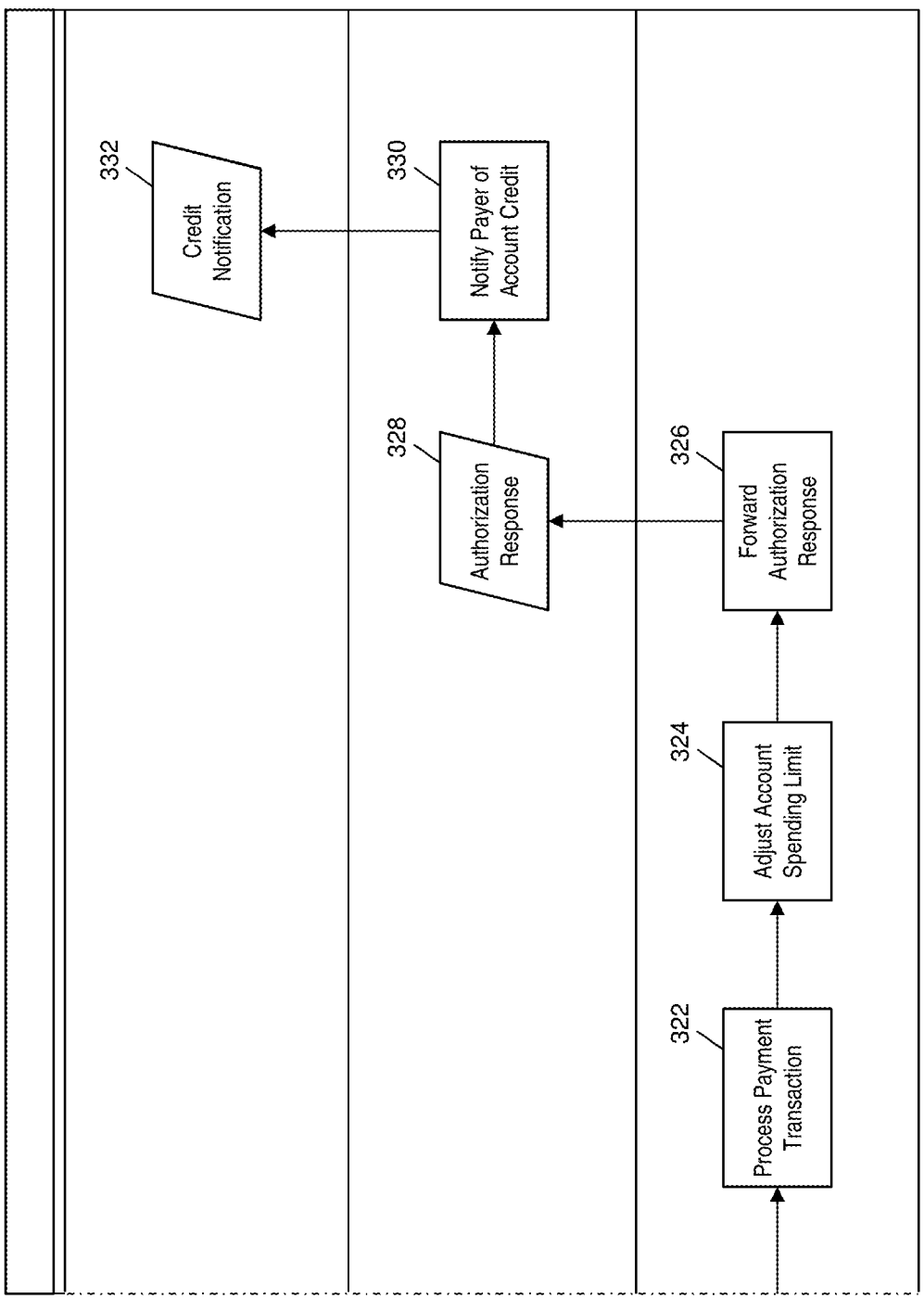

FIGS. 3A and 3B illustrate a process for the crediting of a user account via increase of a spending limit of a CPN associated with the user account with the NFI entity 104.

In step 302, the payer 110 may utilize the payer device 112 to register a user account with the NFI entity 104. As part of the registration, registration data may be submitted by the user to the NFI entity 104, which may receive the data in step 304. The registration data may include a username, password, e-mail address, and any other data that may be suitable dependent on the NFI entity 104 and the services provided to the payer 110. In step 306, the NFI entity 104 may generate a user account, which may include the storage of user registration data in an internal or external database.

In step 308, the NFI entity 104 may request a CPN from the financial institution 106 or payment network 108 (not shown), as applicable, and register the CPN as being associated with the new user account. In step 310, the NFI entity 104 may transmit account information associated with the user account to the processing server 102, which may be received by the receiving unit 202. The account information may include at least the CPN associated with the account, and may also include any other data that may be suitable for performing the functions disclosed here, such as a user identifier (e.g., username, e-mail address, user identification number, etc.). In some embodiments, the CPN may be requested by the processing server 102. In such an embodiment, the processing server 102 may request the CPN following receipt of the user account information, and may provide the CPN to the NFI entity 104 for registration.

In step 312, the processing unit 204 of the processing server 102 may generate an account profile 210 to be associated with the new user account and store the account profile 210 in the account database 208. The account profile 210 may include at least the CPN and a spending limit associated thereto. In some instances, the CPN, as initially requested, may have a zero spending limit.

In step 314, the payer 110 may initiate a purchase to credit their user account via the payer device 112. The purchase may be initiated via use of the platform provided by the NFI entity 104 (e.g., such as a social network) and may be for the purchase of a specified amount of currency. In step 316, the NFI entity 104 may receive purchase information submitted by the payer 110 via the payer device 112 in the initiation of the transaction, which may include at least the currency amount to be purchased and payment credentials for funding of the payment transaction. In step 318, the NFI entity 104 may submit to the processing server 102 an authorization request for the payment transaction from the payer 110 to the NFI entity 114. In some embodiments, the authorization request may be submitted by a third party, such as the financial institution 106 or other third party configured to process transactions on behalf of the NFI entity 104. In such instances, the purchase information submitted by the payer 110 in step 316 may be submitted to the third party, such that the NFI entity 104 may not possess or come into contact with payer payment credentials.

In step 320, the receiving unit 202 of the processing server 102 may receive the authorization request. The authorization request may be a transaction messages formatted pursuant to one or more standards and include a plurality of data elements. The data elements may include at least a data element configured to store a primary account number and a data element configured to store a transaction amount. In some embodiments, the authorization request may also include a data element configured to store a user identifier or CPN, which may be provided by the payer 110 or the NFI entity 104. In some instances, the CPN may be included as a payee of the transaction, such that payment may be made to the transaction account associated with the NFI entity 104 via the association of the CPN with the transaction account.

In step 322, the processing unit 204 of the processing server 102 may process the payment transaction. Processing of the payment transaction may include forwarding, by the transmitting unit 206 of the processing server 102, the transaction message to a payment network 108. In some embodiments, the processing unit 204 may be required to generate a transaction message to forward to the payment network 108, such as in instances where the data may come to the processing server 102 in a format not suitable for transmission to the payment network 108.

In step 324, the transmitting unit 206 may transmit a request to the financial institution 106 or payment network 108, as applicable, to increase the spending limit of the CPN based on the transaction amount. In some instances, the spending limit may be increased based on the transaction amount on a 1:1 basis. In other instances, the spending limit may be increased by an amount less than the transaction amount, and/or may be increased by an amount of a different currency based on a currency exchange rate. In embodiments where the authorization request may not include the CPN, step 324 may also include identification of an account profile 210 associated with the user involved in the transaction for identification of the CPN to be included in the request to increase the spending limit. In such embodiments, the transaction message may include a user identifier or other suitable value, which may be included in a query ran on the account database 208 by the processing unit 204 to identify the account profile 210 associated with the user involved in the transaction.

In step 326, the receiving unit 202 of the processing server 102 may receive an authorization response from the payment network 108 for the payment transaction, and the transmitting unit 206 of the processing server 102 may forward the authorization response on to the NFI entity 104 (e.g., or other third party acting on behalf of the NFI entity 104). In step 328, the NFI entity 104 may receive the authorization response, which may indicate successful or unsuccessful processing of the payment transaction.

In step 330, the NFI entity 104 may transmit a notification to the payer 110 via the payer device 112 indicating the balance of their account following receipt of the authorization response. For example, if the authorization response indicates that the transaction was successful, then the spending limit for the CPN will have been increased. In some embodiments, the processing server 102 may provide an additional message (e.g., separate from and/or accompanying the authorization response) indicative of the increasing of the spending limit of the CPN. In step 332, the payer device 112 may receive the notification of account credit, which may be displayed to the payer 110 to notify the payer 110 of their current amount of currency available for use via their user account.

Process for User-to-Merchant Transactions

Figure 4A:
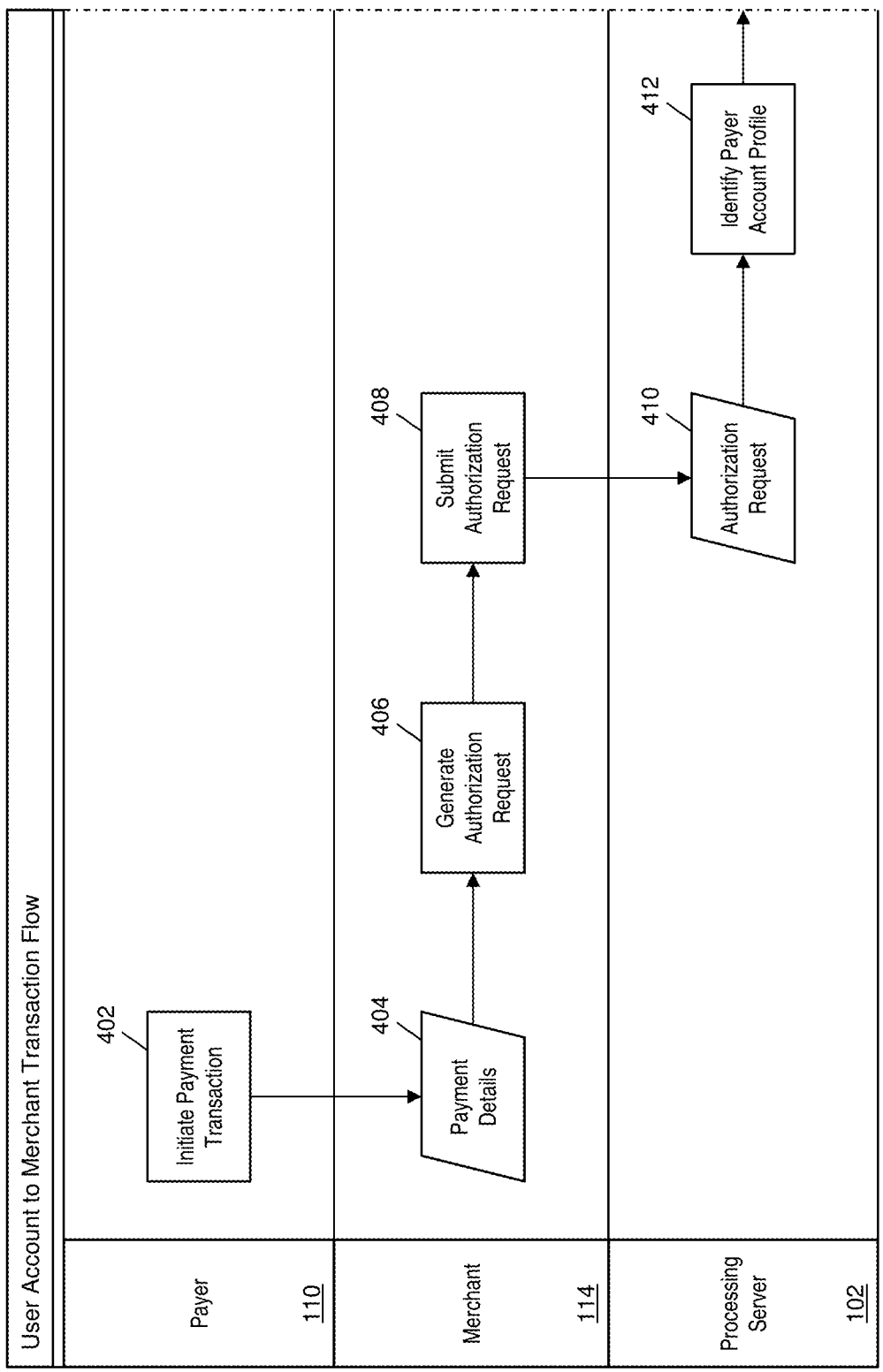
FIGS. 4A and 4B are a flow diagram illustrating a processing flow for processing a transaction involving a user account and a third party merchant in accordance with exemplary embodiments.
Figure 4B:
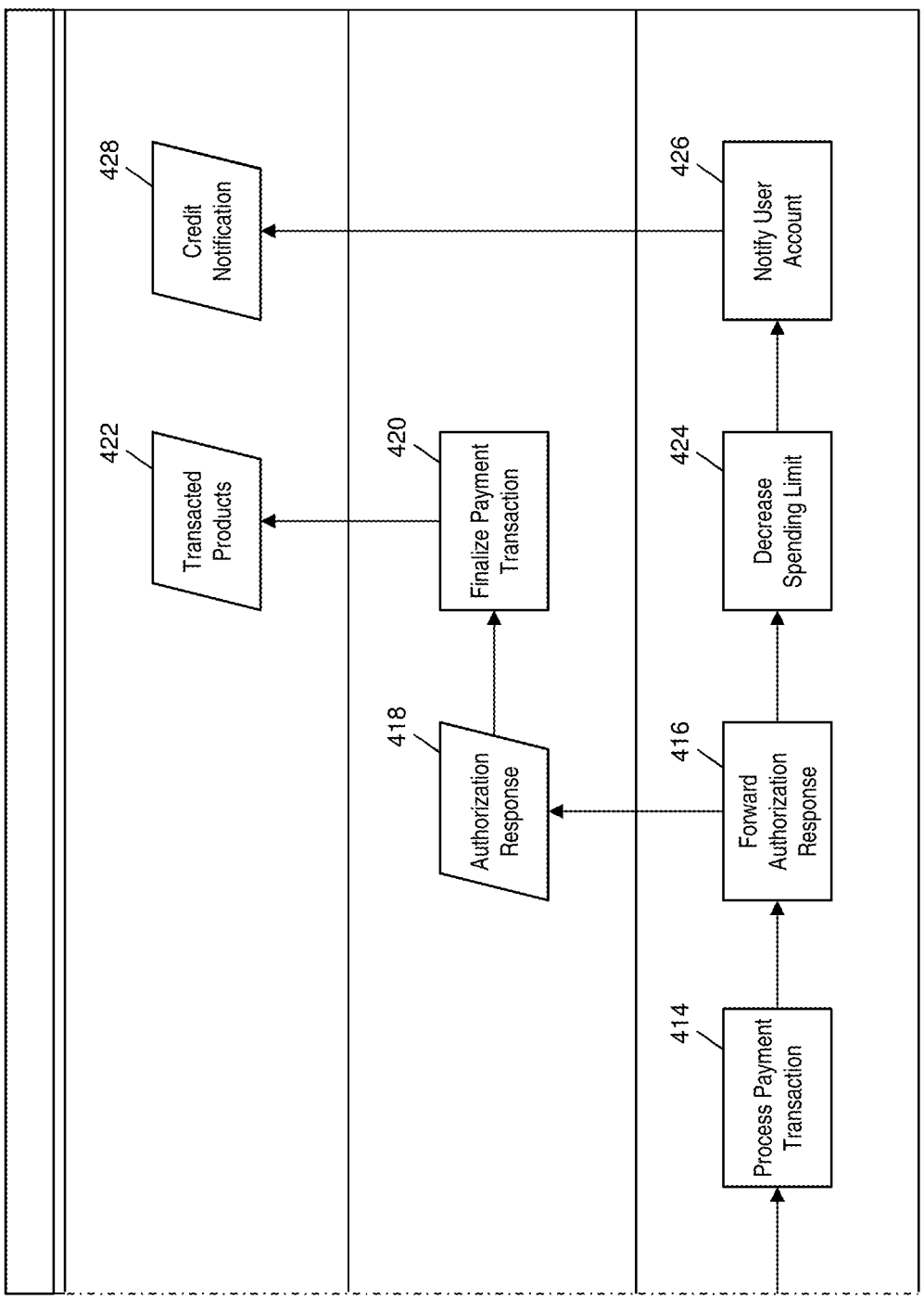

FIGS. 4A and 4B illustrate a process for a user-to-merchant transaction involving a user account with the NFI entity 104 and an external merchant 114 via the CPN associated with the user account.

In step 402, the payer 110 may initiate a payment transaction with a merchant 114 using their payer device 112, which may include the transmission of payment credentials associated with the CPN to the merchant 114. In some embodiments, the payment transaction may be an in-person transaction, which may be initiated by the payer 110 providing payment credentials associated with the CPN to the merchant 114 at a point of sale, such as via a physical card encoded with payment credentials associated with the CPN or via the payer device (e.g., using near field communication). In step 404, the merchant 114 may receive the payment credentials, which may include at least the CPN associated with the user account.

In step 406, the merchant 114 (e.g., or a third party entity acting on behalf of the merchant, such as a financial institution, such as an acquiring bank, the financial institution 106, etc.) may generate an authorization request for the payment transaction. The authorization request may be a transaction message formatted pursuant to one or more standards, which may include a message type indicator indicative of an authorization request, and may include a plurality of data elements including at least a data element configured to store a primary account number that includes the CPN and a data element configured to store a transaction amount. In step 408, the merchant 114 (or a third party entity) may submit the authorization request to the processing server 102.

In step 410, the receiving unit 202 of the processing server 102 may receive the authorization request. In step 412, the processing unit 204 of the processing server 102 may identify the account profile 210 associated with the payer 110 involved in the transaction. The account profile 210 may be identified via querying of the account database 208 using the CPN stored in the data element of the authorization request configured to store a primary account number. In step 414, the payment transaction may be processed, which may be performed via the forwarding of the authorization request to the payment network 108 by the transmitting unit 206 of the processing server 102. In step 416, an authorization response may be received from the payment network 108 and may be forwarded on to the merchant 114. In step 418, the merchant 114 may receive the authorization response. In some embodiments, the authorization request may be initially submitted to the payment network 108, which may forward the authorization request, a copy thereof, and/or transaction data included therein to the processing server 102, which may be received by the processing server 102 in step 410. In such embodiments, the authorization response and/or an indication included therein may be forwarded to both the merchant 114 and the processing server 102 by the payment network 108.

In step 420, the merchant 114 may finalize the payment transaction based on the received authorization response. For example, if the authorization response indicates that the transaction was approved, the merchant 114 may provide the payer 110 with the transacted-for goods or services, which may be received by the payer 110 in step 422. If the authorization response indicates that the transaction was denied, the merchant 114 may inform the payer 110 and may withhold providing any goods or services to the payer 110.

In step 424, the processing unit 204 of the processing server 102 may generate a request, which may be submitted to the financial institution 106 or payment network 108, as applicable, requesting decrease of the spending limit associated with the CPN used in the payment transaction. The request may include at least the CPN and the transaction amount for the payment transaction. The spending limit for the CPN may be adjusted accordingly, and, in step 426, the transmitting unit 206 may transmit a notification to the payer 110, via the payer device 112. In some embodiments, the notification may be transmitted to the NFI entity 104, which may, in turn, transmit a notification to the payer 110, via the payer device 112. In step 428, the payer device 112 may receive the notification and display it to the payer 110, which may notify the payer of the credit (e.g., currency amount) still available for use via their user account, which may correspond to the spending limit still available with the associated CPN.

Process for User-to-User Transactions

Figure 5:
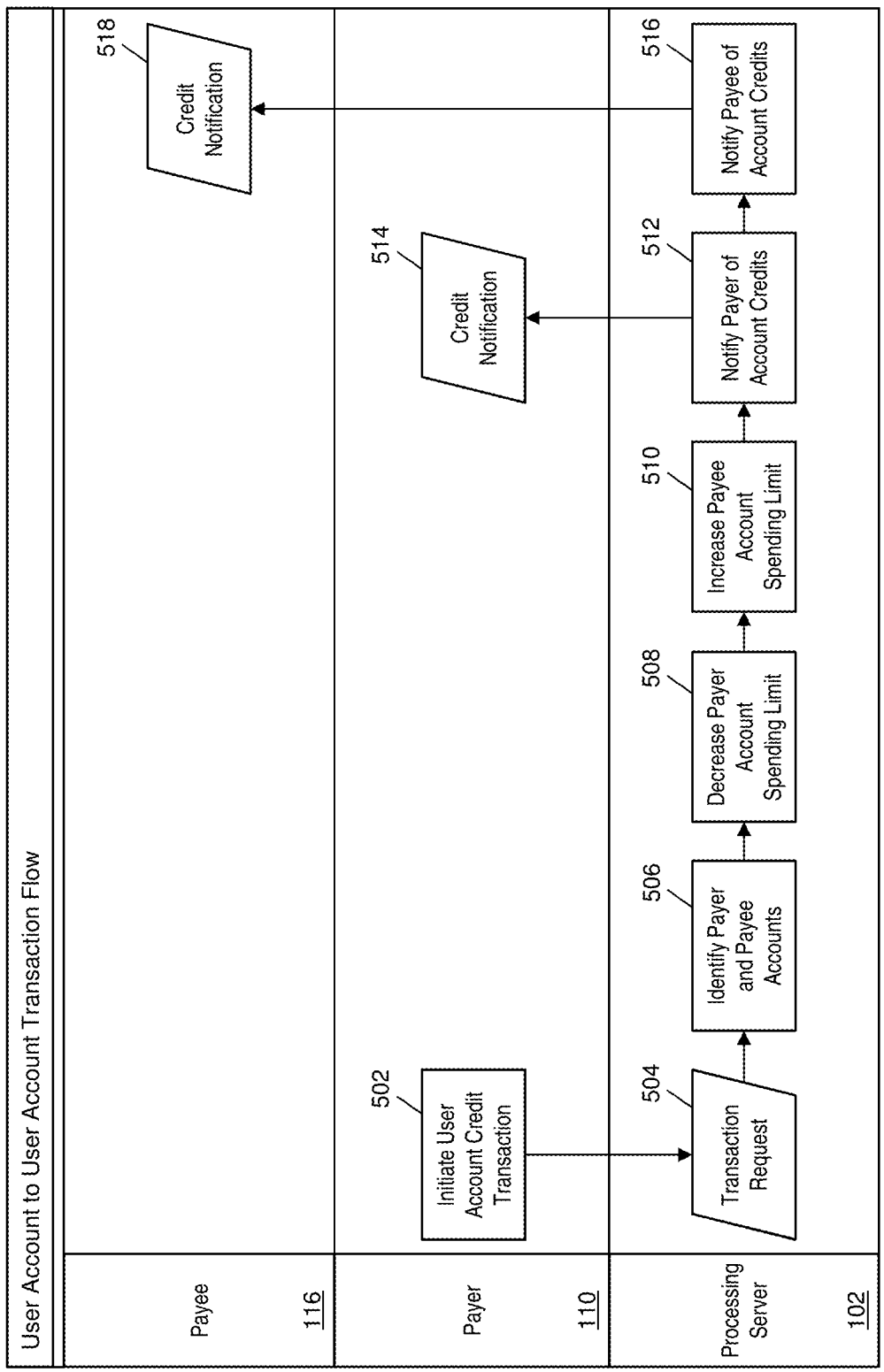
FIG. 5 is a flow diagram illustrating a processing flow for processing a user to user transaction involving controlled payment numbers in accordance with exemplary embodiments.

FIG. 5 illustrates a process for a user-to-user transaction involving user accounts with the NFI entity 104 via the use of CPNs such that funds may be transferred without the use of the payment network 108.

In step 502, the payer 110 may, via the payer device 112, initiate a transaction for payment of credits (e.g., or other currency associated with the NFI entity 104) to the payee 116. The transaction may be initiated using the payer device 112 via a website, application program, or other suitable method provided by the NFI entity 104 or on behalf of the NFI entity 104. In step 504, the receiving unit 202 of the processing server 102 may receive a transaction request for the transaction. The transaction request may include at least the CPN associated with the payer 110, the CPN associated with the payee 116, and the transaction amount. In some embodiments, the transaction request may be a transaction message formatted pursuant to one or more applicable standards, with the included data being comprised in one or more data elements.

In step 506, the processing unit 204 of the processing server 102 may identify a payer account profile 210 in the account database 208 and a payee account profile 210 in the account database 208. The account profiles 210 may be identified by inclusion of the CPNs included in the received transaction request. In step 508, the processing unit 204 may decrease the account spending limit for the payer account profile 210, which may be accomplished by transmitting, via the transmitting unit 206, an instruction to the financial institution 106 or payment network 108, as applicable, to decrease the spending limit of the corresponding CPN. In step 510, the processing unit 204 may increase the account spending limit for the payee account profile 210, such as by transmitting, via the transmitting unit 206, a corresponding instruction to the relevant entity.

In step 512, the transmitting unit 206 may transmit a notification to the payer 110 via the payer device 112, to inform the payer 110 of the remaining credits (e.g., available spending limit) in the user account. In step 514, the payer 110 may receive the notification via the payer device 112, which may be displayed to the payer 110 using known methods. In step 516, the transmitting unit 206 of the processing server 102 may transmit a notification to the payee 116, via the payee device 118, to inform the payee 116 of their available credits in their user account. In step 518, the payee 116 may receive the notification via the payee device 118, which may be displayed to the payee 116 using known methods.

Processing of User Account Transactions

FIG. 6 illustrates a process 600 for the processing of transactions involving user accounts with the NFI entity 104 by the processing server 102 via the use of CPNs.

In step 602, the processing server 102 may store a plurality of account profiles 210 in the account database 208. Each account profile 210 may include at least a CPN and a spending limit, and may also include additional account information associated with a related user account with the NFI entity 104, such as a user identifier. In step 604, the receiving unit 202 of the processing server 102 may receive a transaction request. The transaction request may be a transaction message formatted pursuant to one or more standards, or may be another suitable type of data message. In step 606, the processing unit 204 of the processing server 102 may determine what type of transaction the received transaction request is for.

The determination may be based on the type of transaction request received, data stored in the transaction request, one or more entities involved in the request, etc. For instance, if the transaction request includes a user identifier and a transaction account and/or the transaction account corresponds to the transaction account associated with the NFI entity 104, the transaction may be a credit transaction. If the transaction is a credit transaction, then, in step 608, the processing unit 204 may process the payment transaction for the purchase of currency with the NFI entity 104. Processing of the payment transaction may include forwarding an authorization request to the payment network 108 for processing.

In step 610, the processing unit 204 may determine if the transaction was successful. The determination may be made based on an authorization response received from the payment network 108 and a response code or other data included therein, which may be stored in one or more data elements of the authorization response as based on associated standards. If the transaction is unsuccessful, then, in step 612, the transmitting unit 206 of the processing server 102 may transmit a notification to the NFI entity 104 and/or user involved in the transaction that the transaction was unsuccessful. In some instances, the notification may include a reason, which may be included in the received authorization response.

If the transaction is successful, then, in step 614, the processing unit 204 may increase the spending limit associated with the user account involved in the transaction. This may include the identification of a corresponding account profile 210 using the CPN and/or user identifier included in the received authorization request, and then submitting (e.g., via the transmitting unit 206) a request to the financial institution 106 or payment network 108, as applicable, to increase the spending limit for the CPN. In step 616, the transmitting unit 206 may transmit a notification to the NFI entity 104 and/or user (e.g., via a corresponding user device) indicating that the transaction was approved, and that the spending limit has been increased.

If, in step 606, it is determined that the transaction is for the transfer of funds from the user to another party, then, in step 618, the processing unit 204 may identify an account profile 210 stored in the account database 208 associated with a payer 110 involved in the transaction. The account profile 210 may be identified via a CPN included in a data element of the received transaction message configured to store a personal account number. In step 620, the spending limit for the CPN included in the identified account profile 210 may be decreased. The spending limit may be decreased via the transmission of a request by the transmitting unit 206 to the financial institution 106 or payment network 108, as applicable, for reduction in the spending limit by a transaction amount included in the transaction request, such as included in a data element configured to store a transaction amount in the transaction message.

In step 622, the processing unit 204 may determine if the payee for the transaction is another user (e.g., the payee 116) or a merchant 114. The payee may be determined based on the recipient included in the received transaction request, and/or the type of request. For example, if the transaction request is not a message, and/or the recipient is a CPN or user identifier, then the payee may be determined to be another user of the NFI entity 104. If the payee is determined to be a merchant 114, then, in step 624, the processing unit 204 may process a payment transaction for payment to the merchant 114. The payment transaction may be drawn on the transaction account of the NFI entity 104, as a result of use of the CPN associated with the payer 110, which may be tied to the NFI entity's transaction account. In step 626, an authorization response may be received by the receiving unit 202 from the payment network 108 due to processing of the payment transaction, which may be forwarded on to the merchant 114, an acquiring bank, the NFI entity 104, and/or to the payer 110 via the payer device 112 by the transmitting unit 206.

If, in step 622, the processing unit 204 determines that the payee is not a merchant 114 but another user of the NFI entity 104, then, in step 628, the processing unit 204 may identify an account profile 210 in the account database 208 associated with the payee 116 based on inclusion of a CPN included as the recipient in the received transaction request, and may submit a request to the financial institution 106 or payment network 108, as applicable, to increase the spending limit of the CPN. In step 630, the transmitting unit 206 may transmit a notification to the payer 110 and payee 116 to notify the respective users of the adjustments to their spending limit based on the transaction. In some instances, the processing server 102 may notify the NFI entity 104, which may notify the users of the transaction and resulting account balances.

Process for Verifying User Identities

Figure 7A:
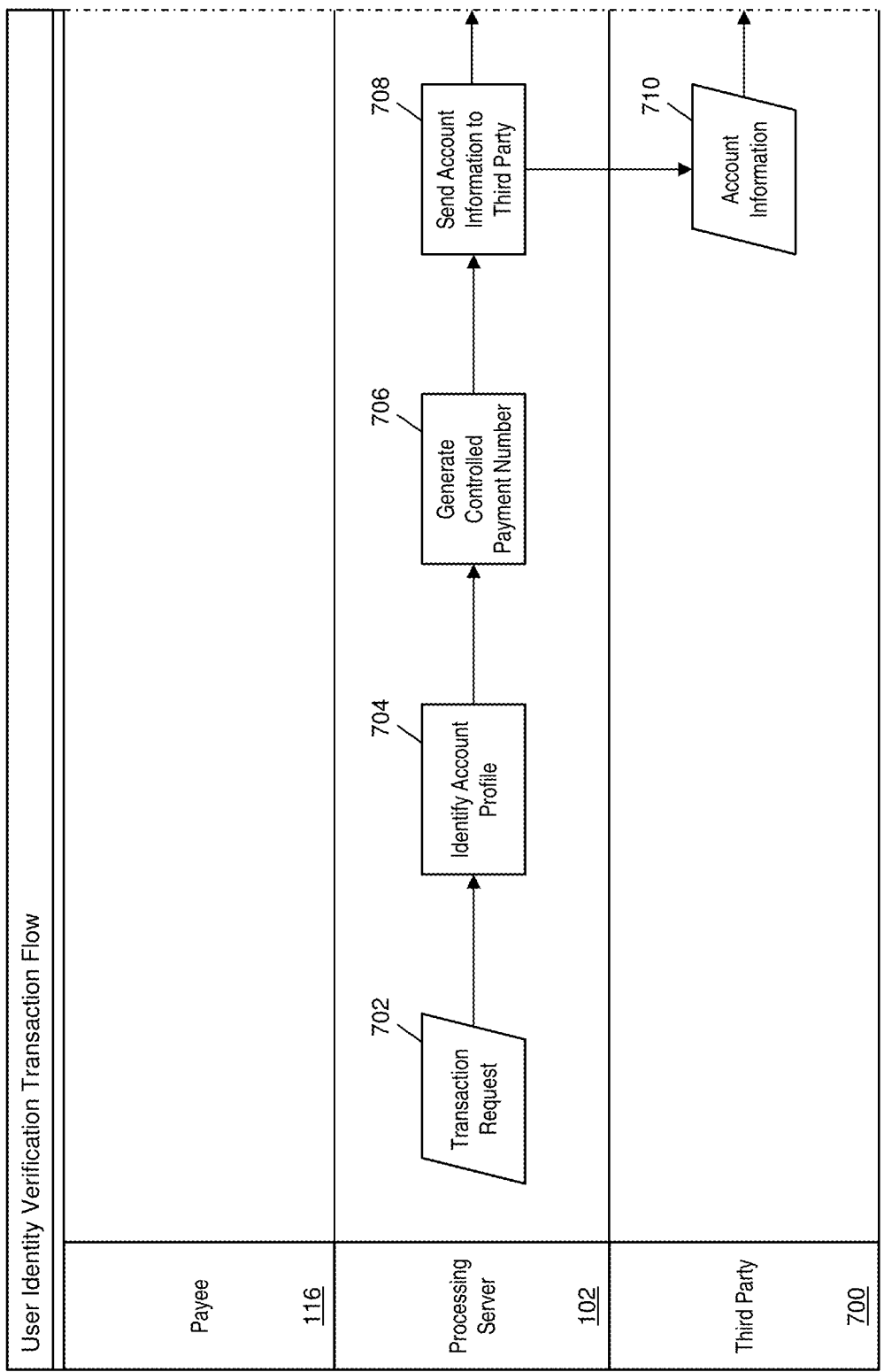
FIGS. 7A and 7B are a flow diagram illustrating a processing flow for verifying user identities in accordance with exemplary embodiments.
Figure 7B:
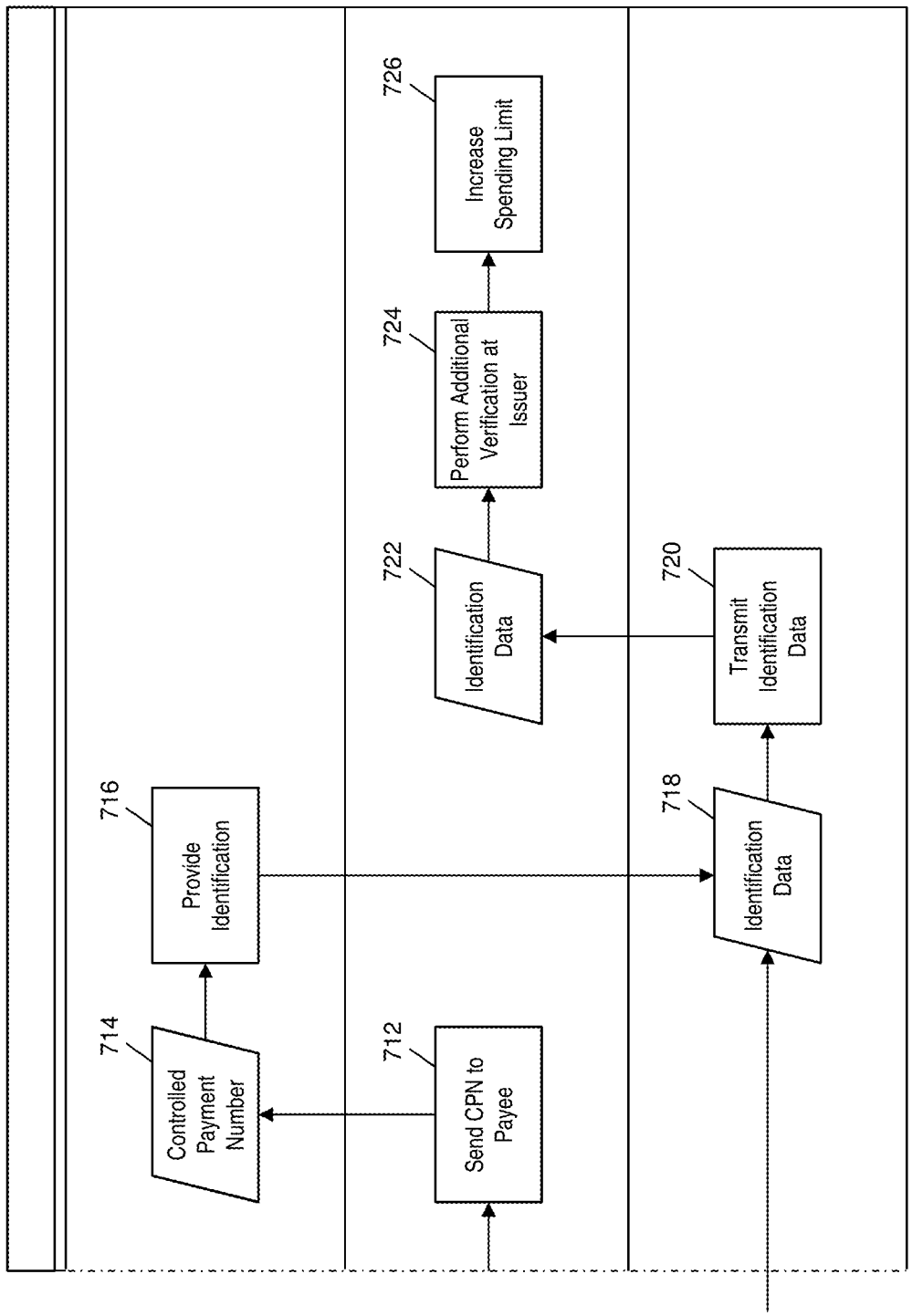

FIGS. 7A and 7B illustrate a process for the verification of a user identity for a payee 116 associated with a user account of the NFI entity 104.

In step 702, the receiving unit 202 of the processing server 102 may receive a transaction request for a user-to-user or other payment transaction where the payee 116 is to receive currency of the NFI entity 104 that may be usable in user-to-merchant transactions. The transaction request may include at least an account identifier associated with the user account corresponding to the payee 116 and a transaction amount. The transaction amount may be or may be used to identify the value of currency to be provided to the payee 116.

In step 704, the processing unit 204 of the processing server may identify an account profile 210 in the account database 208 related to the user account corresponding to the payee 116. The account profile 210 may include the account identifier that is included in the received transaction request. In step 706, the processing unit 204 may generate a CPN for use by the payee 116 in future transactions. The CPN may be associated with the transaction account of the NFI entity 104 and may have a spending limit that is zero or is otherwise inaccessible or unusable by the payee 116 prior to identity verification. In some embodiments, the account profile 210 related to the payee 116 may already include a CPN. In such instances, step 706 may include verification by the processing unit 204 that the account profile 210 does not include identification data for the payee 116 and/or that identification data for the payee 116 is required.

In step 708, the transmitting unit 206 of the processing server 102 may transmit at least the account identifier to a third party 700 for use in verification of the identity of the payee 116. In some embodiments, the transmitting unit 206 may also transmit the CPN to the third party 700 or other data associated with the CPN, such as a payment card encoded with the CPN or information associated therewith. For example, the processing server 102 may initiate the encoding of a physical payment card with the CPN, which may be sent to the third party 700 along with the account identifier, to provide to the payee 116 in exchange for the identification information. In step 710, the third party 700 may receive the account information from the processing server 102.

In step 712, the transmitting unit 206 of the processing server 102 may transmit the CPN for distribution to the payee 116. In some embodiments, the CPN may be directly transmitted to the payee 116, such as in an electronic transmission to the payee device 118 (e.g., for storage in an electronic wallet application program). In other embodiments, the CPN may be encoded in a physical payment card or other payment instrument that may be distributed to the payee 116. It will be apparent to persons having skill in the relevant art that in embodiments where the CPN may have been provided to the third party 700 in step 708, then step 712 may be performed by the third party 700. In step 714, the payee 116 may receive the controlled payment number and, if applicable, any payment instrument associated therewith.

In step 716, the payee 116 may provide identification to the third party 700. Identification may include a name, identification number, date of birth, age, gender, signature, image, biometric data, or any other suitable data. For example, the payee 116 may sign for a payment instrument, may allow the third party 700 to make a photo of the payee 116, may provide the third party 700 with a government-issued picture identification card, may provide the third party 700 with a fingerprint scan, etc. In step 718, the third party 700 may receive or otherwise obtain the identification data from the payee 116.

In step 720, the third party 700 may provide the identification data to the processing server 102. The identification data may also include the account identifier included in the account profile 210 associated with the payee 116. In step 722, the receiving unit 202 of the processing server 102 may receive the identification data and included account identifier, such as for the processing unit 204 to use to ensure that the identification data is associated with the correct account profile 210. In step 724, the processing server 102 may perform further verification with an issuing financial institution, such as the financial institution 106 associated with the transaction account of the NFI entity 104 (e.g., from which the CPN draws funds). The further verification may include the transmitting of the identification data to the financial institution 106, who may perform additional verification, and the receipt of a notification from the financial institution 106 indicating of the additional verification was successful. The additional verification may include the checking of the identification data against publicly available data or other data, such as public records, government agency data, credit bureau data, account data for customers of the financial institution 106, etc. For example, the financial institution 106 may verify that a name included in the identification data matches a government-issued identification number also included in the identification data, with agency records. In some embodiments, the identification data may be transmitted directly to the financial institution 106 (e.g., in step 720), with the processing server 102 receiving the notification from the financial institution 106 in step 724.

In step 726, the processing unit 204 may increase the spending limit included in the account profile 210 for the CPN provided to the payee 116 based on the transaction amount. The payee 116 may then be able to use the CPN in user-to-merchant transactions based on the spending limit.

In some instances, the transmitting unit 206 of the processing server 102 may transmit a notification to the payee 116 (e.g., to the payee device 118 associated with the payee 116) indicating that the CPN is available for use and/or that the spending limit is increased.

Exemplary Method for Providing Credit for a User Account

Figure 8:
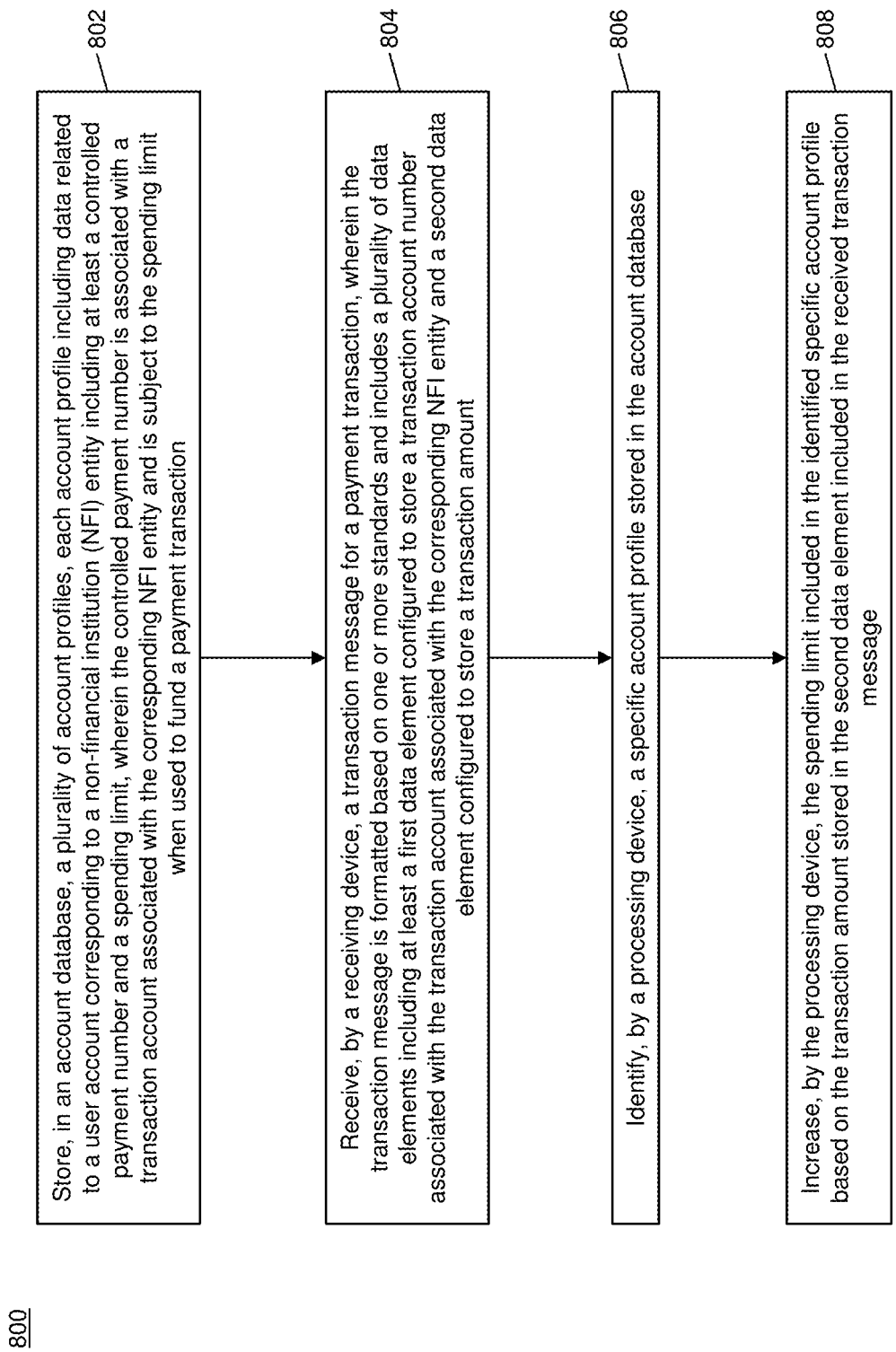
FIG. 8 is a flow chart illustrating an exemplary method for providing credit for a user account in accordance with exemplary embodiments.

FIG. 8 illustrates a method 800 for the providing of credit to a user account with an NFI entity 104 via the spending limit of a CPN.

In step 802, a plurality of account profiles (e.g., account profiles 210) may be stored in an account database (e.g., the account database 208), wherein each account profile 210 includes data related to a user account corresponding to a non-financial institution (NFI) entity (e.g., the NFI entity 104) including at least a controlled payment number (CPN) and a spending limit, wherein the CPN is associated with a transaction account associated with the corresponding NFI entity 104 and is subject to the spending limit when used to fund a payment transaction. In some embodiments, payment transactions involving a CPN included in a stored account profile 210 may be drawn against the associated transaction account.

In step 804, a transaction message for a payment transaction may be received by a receiving device (e.g., the receiving unit 202), wherein the transaction message is formatted based on one or more standards and includes a plurality of data elements including at least a first data element configured to store a transaction account number associated with the transaction account associated with the corresponding NFI entity 104 and a second data element configured to store a transaction amount. In one embodiment, the transaction message may further include a message type indicator indicative of an authorization request.

In step 806, a specific account profile 210 stored in the account database 208 may be identified by a processing device (e.g., the processing unit 204). In one embodiment, the transaction message may further include a third data element configured to store a CPN, and the specific account profile 210 may be identified based on inclusion of a CPN that corresponds to the CPN stored in the third data element included in the received transaction message. In step 808, the spending limit included in the identified specific account profile 210 may be increased by the processing device 204 based on the transaction amount stored in the second data element included in the received transaction message.

In one embodiment, the transaction message may further include a third data element configured to store a transaction account number associated with a payer (e.g., the payer 110), and the method 800 may further include processing, by the processing device 204, the payment transaction for payment of the transaction amount from a transaction account associated with the transaction account number associated with the payer 110 to the transaction account associated with the corresponding NFI entity 104. In a further embodiment, the method 800 may even further include transmitting, by a transmitting device (e.g., the transmitting unit 206), a response message formatted based on the one or more payment network standards in response to the received transaction messaged based on a result of the processing of the payment transaction.

In some embodiments, the method 800 may also include receiving, by the receiving device 202, an account adjustment request from an NFI entity 104, wherein the account adjustment request includes at least a specific CPN associated with a transaction account associated with the NFI entity, and wherein the specific account profile 210 is identified based on inclusion of the specific CPN included in the received account adjustment request. In a further embodiment, the account adjustment request may further include an adjustment amount based on the transaction amount stored in the second data element included in the received transaction message, and the spending limit included in the identified specific account profile 210 may be increased by the adjustment amount included in the received account adjustment request. In an even further embodiment, the adjustment amount and the spending limit may be associated with a virtual, non-fiat currency.

Exemplary Method for Processing Transactions in User Accounts

Figure 9:
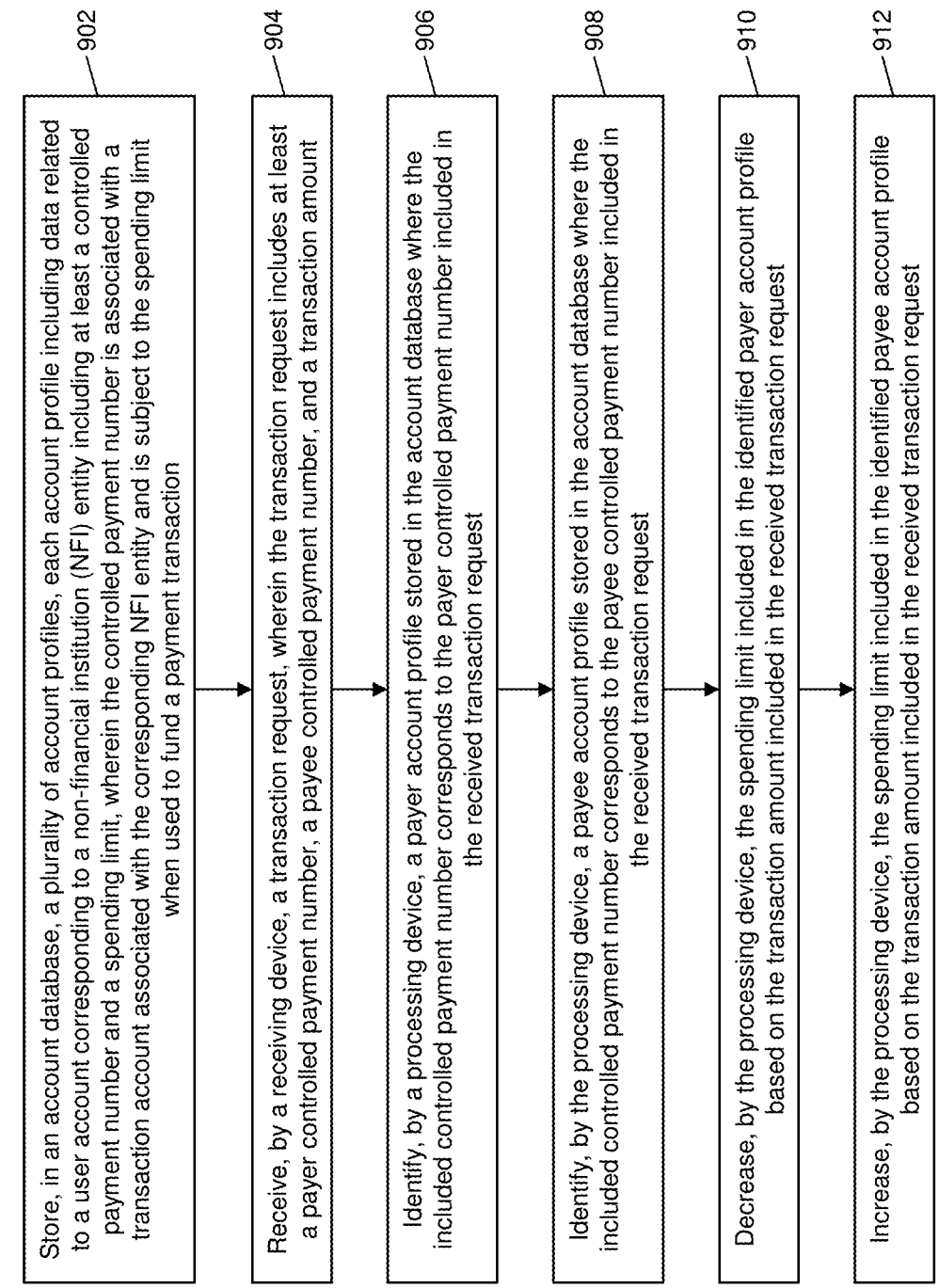
FIG. 9 is a flow chart illustrating an exemplary method for processing transactions in user accounts in accordance with exemplary embodiments.

FIG. 9 illustrates a method 900 for the processing of user-to-user transactions for user accounts of an NFI entity 104 using CPNs.

In step 902, a plurality of account profiles (e.g., account profiles 210) may be stored in an account database (e.g., the account database 208), wherein each account profile 210 includes data related to a user account corresponding to a non-financial institution (NFI) entity (e.g., the NFI entity 104) including at least a controlled payment number (CPN) and a spending limit, and wherein the CPN is associated with a transaction account associated with the corresponding NFI entity and is subject to the spending limit when used to fund a payment transaction. In one embodiment, payment transactions involving a CPN included in a stored account profile 210 may be drawn against the associated transaction account.

In step 904, a transaction request may be received by a receiving device (e.g., the receiving unit 202), wherein the transaction request includes at least a payer CPN, a payee CPN, and a transaction amount. In some embodiments, the spending limit included in each account profile 210 and the transaction amount may be associated with a virtual, non-fiat currency. In step 906, a payer account profile 210 stored in the account database 208 may be identified by a processing device (e.g., the processing unit 204) where the included CPN corresponds to the payer CPN included in the received transaction request.

In step 908, a payee account profile 210 stored in the account database 208 may be identified by the processing device 204 where the included CPN corresponds to the payee CPN included in the received transaction request. In step 910, the spending limit included in the identified payer account profile 210 may be decreased by the processing device 204 based on the transaction amount included in the received transaction request. In step 912, the spending limit included in the identified payee account profile 210 may be increased by the processing device 204 based on the transaction amount included in the received transaction request.

In one embodiment, the transaction request may be a transaction message formatted based on one or more standards, and the transaction message may include a plurality of data elements including at least a first data element configured to store the payer CPN, a second data element configured to store the payee CPN, and a third data element configured to store the transaction amount. In a further embodiment, the transaction message may further include a message type indicator indicative of an authorization request. In another further embodiment, the method 900 may also include transmitting, by a transmitting device (e.g., the transmitting unit 206), a response message formatted based on the one or more standards in response to the received transaction request, wherein the response message may include a message type indicator indicative of an authorization response.

Exemplary Method for Verification of User Identity

Figure 10:
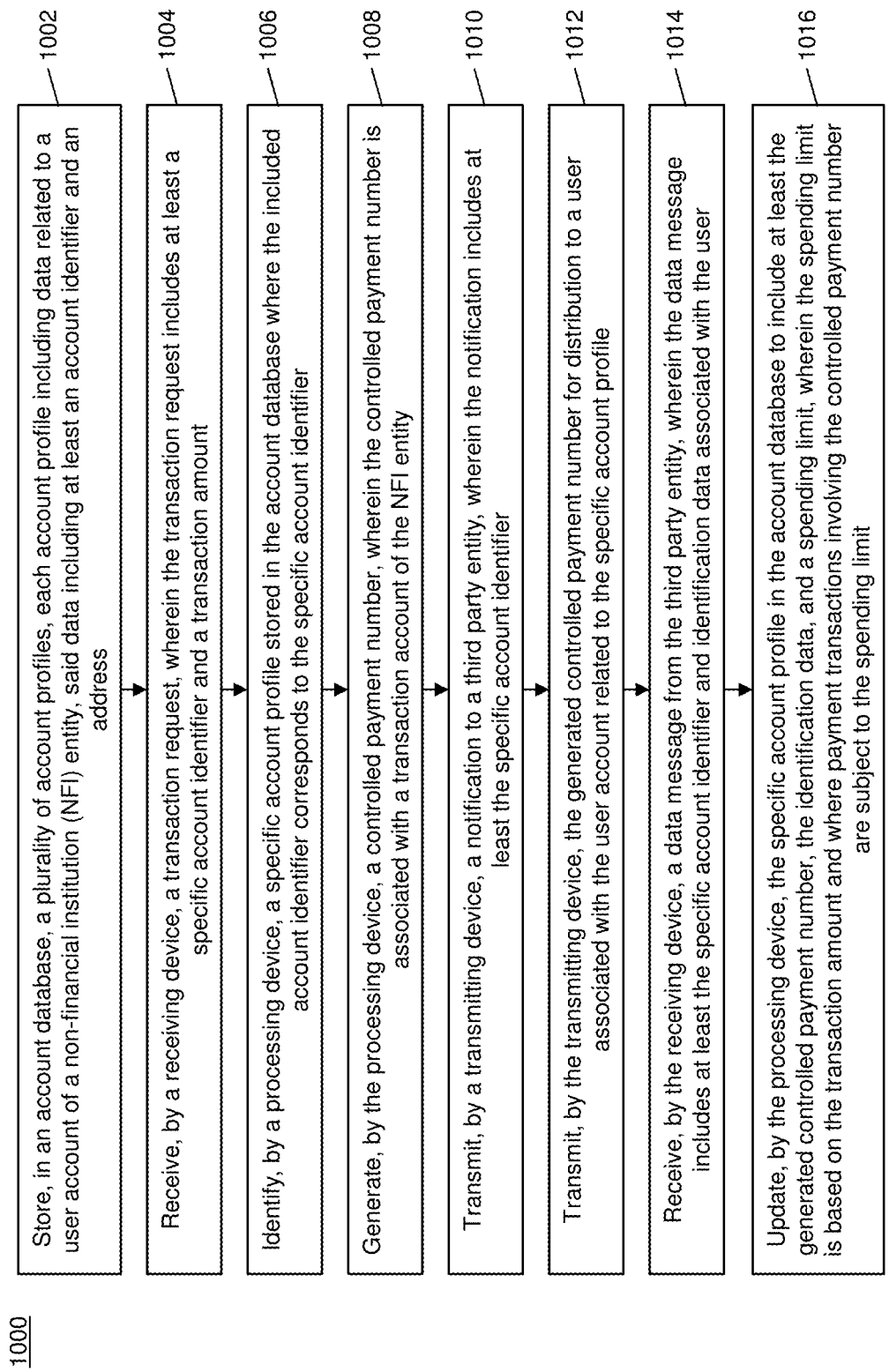
FIG. 10 is a flow chart illustrating an exemplary method for verification of user identity in accordance with exemplary embodiments.

FIG. 10 illustrates a method 1000 for the verification of a user identity prior to the availability of funds for a user of a non-financial institution entity.

In step 1002, a plurality of account profiles (e.g., account profiles 210) may be stored in an account database (e.g., the account database 208), wherein each account profile includes data related to a user account of a non-financial institution (NFI) entity (e.g., NFI entity 104), said data including at least an account identifier and an address. In step 1004, a transaction request may be received by a receiving device (e.g., the receiving unit 202), wherein the transaction request includes at least a specific account identifier and a transaction amount.

In step 1006, a specific account profile stored in the account database may be identified by a processing device (e.g., the processing unit 204) where the included account identifier corresponds to the specific account identifier. In step 1008, a controlled payment number may be generated by the processing device, wherein the controlled payment number is associated with a transaction account of the NFI entity.

In step 1010, a notification may be transmitted to a third party entity by a transmitting device (e.g., the transmitting unit 206), wherein the notification includes at least the specific account identifier. In step 1012, the generated controlled payment number may be transmitted by the transmitting device for distribution to a user (e.g., the payee 116) associated with the user account related to the specific account profile.

In step 1014, a data message from the third party entity may be received by the receiving device, wherein the data message includes at least the specific account identifier and identification data associated with the user. In step 1016, the specific account profile in the account database may be updated by the processing device to include at least the generated controlled payment number, the identification data, and a spending limit, wherein the spending limit is based on the transaction amount and where payment transactions involving the controlled payment number are subject to the spending limit.

In one embodiment, the specific account profile may be updated to include the controlled payment number and the spending limit prior to receiving the data message from the third party entity and updating the specific account profile to include the identification data. In a further embodiment, the spending limit in the specific account profile may not be able to be increased until the specific account profile is updated to include the identification data associated with the user.

In some embodiments, transmitting the generated controlled payment number may include electronically transmitting the generated controlled payment number to a mobile device associated with the address included in the specific account profile. In one embodiment, the generated controlled payment number may be transmitted to a payment card engine configured to encode the generated controlled payment number in a physical payment card for distribution to the user using the address included in the specific account profile.

In some embodiments, the identification data may include at least one of: an identification number, name, date of birth, age, gender, signature, image, and biometric data. In one embodiment, the address included in the specific account profile may be associated with a geographic area, and the third party entity may be associated with the geographic area.

In some embodiments, the method 1000 may further include transmitting, by the transmitting device, at least the identification data and the specific account identifier to a financial institution associated with the transaction account of the NFI entity. In a further embodiment, the method 1000 may even further include receiving, by the receiving device, a verification from the financial institution, wherein the verification includes at least the specific account identifier and an indication of verification of the identification data. In an even further embodiment, the verification may be received prior to updating the specific account profile.

Payment Transaction Processing System and Process

Figure 11:
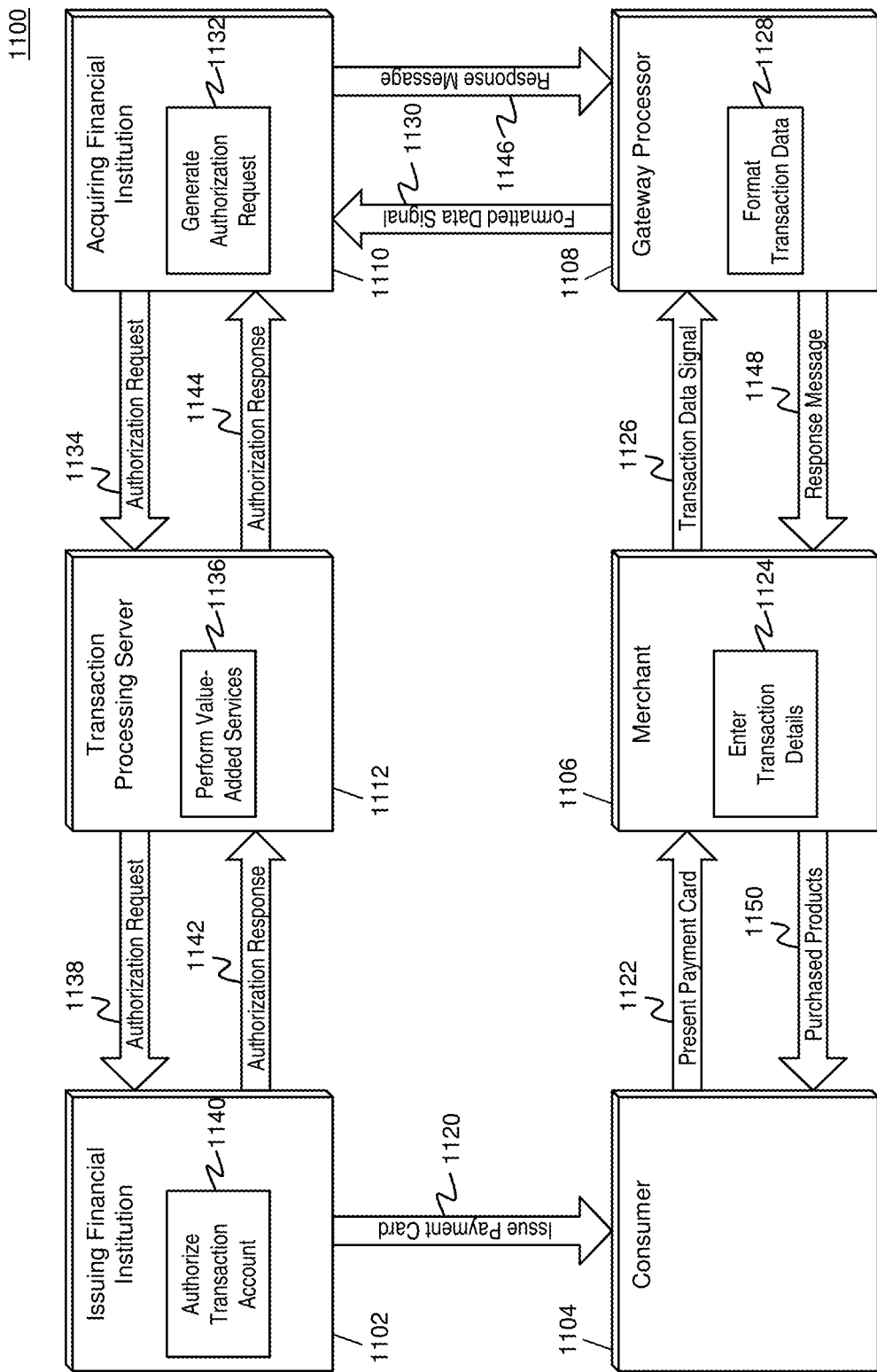
FIG. 11 is a flow diagram illustrating the processing of a payment transaction in accordance with exemplary embodiments.

FIG. 11 illustrates a transaction processing system and a process 1100 for the processing of payment transactions in the system, which may include the processing of thousands, millions, or even billions of transactions during a given period (e.g., hourly, daily, weekly, etc.). The process 1100 and steps included therein may be performed by one or more components of the system 100 discussed above, such as the payer 110, payee 116, processing server 102, payment network 108, merchant 114, and financial institution 106. The processing of payment transactions using the system and process 1100 illustrated in FIG. 11 and discussed below may utilize the payment rails, which may be comprised of the computing devices and infrastructure utilized to perform the steps of the process 1100 as specially configured and programmed by the entities discussed below, including the transaction processing server 1112, which may be associated with one or more payment networks configured to processing payment transactions. It will be apparent to persons having skill in the relevant art that the process 1100 may be incorporated into the processes illustrated in FIGS. 3A, 3B, 4A, 4B, 5, 6, 7A, 7B, and 8-10, discussed above, with respect to the step or steps involved in the processing of a payment transaction. In addition, the entities discussed herein for performing the process 1100 may include one or more computing devices or systems configured to perform the functions discussed below. For instance, the merchant 1106 may be comprised of one or more point of sale devices, a local communication network, a computing server, and other devices configured to perform the functions discussed below.

In step 1120, an issuing financial institution 1102 may issue a payment card or other suitable payment instrument to a consumer 1104. The issuing financial institution may be a financial institution, such as a bank, or other suitable type of entity that administers and manages payment accounts and/or payment instruments for use with payment accounts that can be used to fund payment transactions. The consumer 1104 may have a transaction account with the issuing financial institution 1102 for which the issued payment card is associated, such that, when used in a payment transaction, the payment transaction is funded by the associated transaction account. In some embodiments, the payment card may be issued to the consumer 1104 physically. In other embodiments, the payment card may be a virtual payment card or otherwise provisioned to the consumer 1104 in an electronic format.

In step 1122, the consumer 1104 may present the issued payment card to a merchant 1106 for use in funding a payment transaction. The merchant 1106 may be a business, another consumer, or any entity that may engage in a payment transaction with the consumer 1104. The payment card may be presented by the consumer 1104 via providing the physical card to the merchant 1106, electronically transmitting (e.g., via near field communication, wireless transmission, or other suitable electronic transmission type and protocol) payment details for the payment card, or initiating transmission of payment details to the merchant 1106 via a third party. The merchant 1106 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 1124, the merchant 1106 may enter transaction details into a point of sale computing system. The transaction details may include the payment details provided by the consumer 1104 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 1106 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 1106 may be an online retailer in an e-commerce transaction. In such embodiments, the transaction details may be entered in a shopping cart or other repository for storing transaction data in an electronic transaction as will be apparent to persons having skill in the relevant art.

In step 1126, the merchant 1106 may electronically transmit a data signal superimposed with transaction data to a gateway processor 1108. The gateway processor 1108 may be an entity configured to receive transaction details from a merchant 1106 for formatting and transmission to an acquiring financial institution 1110. In some instances, a gateway processor 1108 may be associated with a plurality of merchants 1106 and a plurality of acquiring financial institutions 1110. In such instances, the gateway processor 1108 may receive transaction details for a plurality of different transactions involving various merchants, which may be forwarded on to appropriate acquiring financial institutions 1110. By having relationships with multiple acquiring financial institutions 1110 and having the requisite infrastructure to communicate with financial institutions using the payment rails, such as using application programming interfaces associated with the gateway processor 508 or financial institutions used for the submission, receipt, and retrieval of data, a gateway processor 1108 may act as an intermediary for a merchant 1106 to be able to conduct payment transactions via a single communication channel and format with the gateway processor 1108, without having to maintain relationships with multiple acquiring financial institutions 1110 and payment processors and the hardware associated thereto. Acquiring financial institutions 1110 may be financial institutions, such as banks, or other entities that administers and manages payment accounts and/or payment instruments for use with payment accounts. In some instances, acquiring financial institutions 1110 may manage transaction accounts for merchants 1106. In some cases, a single financial institution may operate as both an issuing financial institution 1102 and an acquiring financial institution 1110.

The data signal transmitted from the merchant 1106 to the gateway processor 1108 may be superimposed with the transaction details for the payment transaction, which may be formatted based on one or more standards. In some embodiments, the standards may be set forth by the gateway processor 1108, which may use a unique, proprietary format for the transmission of transaction data to/from the gateway processor 1108. In other embodiments, a public standard may be used, such as the International Organization for Standardization's ISO 81183 standard. The standard may indicate the types of data that may be included, the formatting of the data, how the data is to be stored and transmitted, and other criteria for the transmission of the transaction data to the gateway processor 1108.

In step 1128, the gateway processor 1108 may parse the transaction data signal to obtain the transaction data superimposed thereon and may format the transaction data as necessary. The formatting of the transaction data may be performed by the gateway processor 1108 based on the proprietary standards of the gateway processor 1108 or an acquiring financial institution 1110 associated with the payment transaction. The proprietary standards may specify the type of data included in the transaction data and the format for storage and transmission of the data. The acquiring financial institution 1110 may be identified by the gateway processor 1108 using the transaction data, such as by parsing the transaction data (e.g., deconstructing into data elements) to obtain an account identifier included therein associated with the acquiring financial institution 1110. In some instances, the gateway processor 1108 may then format the transaction data based on the identified acquiring financial institution 1110, such as to comply with standards of formatting specified by the acquiring financial institution 1110. In some embodiments, the identified acquiring financial institution 1110 may be associated with the merchant 1106 involved in the payment transaction, and, in some cases, may manage a transaction account associated with the merchant 1106.

In step 1130, the gateway processor 1108 may electronically transmit a data signal superimposed with the formatted transaction data to the identified acquiring financial institution 1110. The acquiring financial institution 1110 may receive the data signal and parse the signal to obtain the formatted transaction data superimposed thereon. In step 1132, the acquiring financial institution may generate an authorization request for the payment transaction based on the formatted transaction data. The authorization request may be a specially formatted transaction message that is formatted pursuant to one or more standards, such as the ISO 81183 standard and standards set forth by a payment processor used to process the payment transaction, such as a payment network. The authorization request may be a transaction message that includes a message type indicator indicative of an authorization request, which may indicate that the merchant 1106 involved in the payment transaction is requesting payment or a promise of payment from the issuing financial institution 1102 for the transaction. The authorization request may include a plurality of data elements, each data element being configured to store data as set forth in the associated standards, such as for storing an account number, application cryptogram, transaction amount, issuing financial institution information, etc.

In step 1134, the acquiring financial institution 1110 may electronically transmit the authorization request to a transaction processing server 1112 for processing. The transaction processing server 1112 may be comprised of one or more computing devices as part of a payment network configured to process payment transactions. In some embodiments, the authorization request may be transmitted by a transaction processor at the acquiring financial institution 1110 or other entity associated with the acquiring financial institution. The transaction processor may be one or more computing devices that include a plurality of communication channels for communication with the transaction processing server 1112 for the transmission of transaction messages and other data to and from the transaction processing server 1112. In some embodiments, the payment network associated with the transaction processing server 1112 may own or operate each transaction processor such that the payment network may maintain control over the communication of transaction messages to and from the transaction processing server 1112 for network and informational security.

In step 1136, the transaction processing server 1112 may perform value-added services for the payment transaction. Value-added services may be services specified by the issuing financial institution 1102 that may provide additional value to the issuing financial institution 1102 or the consumer 1104 in the processing of payment transactions. Value-added services may include, for example, fraud scoring, transaction or account controls, account number mapping, offer redemption, loyalty processing, etc. For instance, when the transaction processing server 1112 receives the transaction, a fraud score for the transaction may be calculated based on the data included therein and one or more fraud scoring algorithms and/or engines. In some instances, the transaction processing server 1112 may first identify the issuing financial institution 1102 associated with the transaction, and then identify any services indicated by the issuing financial institution 1102 to be performed. The issuing financial institution 1102 may be identified, for example, by data included in a specific data element included in the authorization request, such as an issuer identification number. In another example, the issuing financial institution 1102 may be identified by the primary account number stored in the authorization request, such as by using a portion of the primary account number (e.g., a bank identification number) for identification.

In step 1138, the transaction processing server 1112 may electronically transmit the authorization request to the issuing financial institution 1102. In some instances, the authorization request may be modified, or additional data included in or transmitted accompanying the authorization request as a result of the performance of value-added services by the transaction processing server 1112. In some embodiments, the authorization request may be transmitted to a transaction processor (e.g., owned or operated by the transaction processing server 1112) situated at the issuing financial institution 1102 or an entity associated thereof, which may forward the authorization request to the issuing financial institution 1102.

In step 1140, the issuing financial institution 1102 may authorize the transaction account for payment of the payment transaction. The authorization may be based on an available credit amount for the transaction account and the transaction amount for the payment transaction, fraud scores provided by the transaction processing server 1112, and other considerations that will be apparent to persons having skill in the relevant art. The issuing financial institution 1102 may modify the authorization request to include a response code indicating approval (e.g., or denial if the transaction is to be denied) of the payment transaction. The issuing financial institution 1102 may also modify a message type indicator for the transaction message to indicate that the transaction message is changed to be an authorization response. In step 1142, the issuing financial institution 1102 may transmit (e.g., via a transaction processor) the authorization response to the transaction processing server 1112.

In step 1144, the transaction processing server 1112 may forward the authorization response to the acquiring financial institution 1110 (e.g., via a transaction processor). In step 1146, the acquiring financial institution may generate a response message indicating approval or denial of the payment transaction as indicated in the response code of the authorization response, and may transmit the response message to the gateway processor 1108 using the standards and protocols set forth by the gateway processor 1108. In step 1148, the gateway processor 1108 may forward the response message to the merchant 1106 using the appropriate standards and protocols. In step 1150, assuming the transaction was approved, the merchant 1106 may then provide the products or services purchased by the consumer 1104 as part of the payment transaction to the consumer 1104.

In some embodiments, once the process 1100 has completed, payment from the issuing financial institution 1102 to the acquiring financial institution 1110 may be performed. In some instances, the payment may be made immediately or within one business day. In other instances, the payment may be made after a period of time, and in response to the submission of a clearing request from the acquiring financial institution 1110 to the issuing financial institution 1102 via the transaction processing server 1110. In such instances, clearing requests for multiple payment transactions may be aggregated into a single clearing request, which may be used by the transaction processing server 1112 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 1140), the transaction processing server 1112 may be configured to perform authorization of transactions on behalf of the issuing financial institution. Such actions may be referred to as "stand-in processing," where the transaction processing server "stands in" as the issuing financial institution 1102. In such instances, the transaction processing server 1112 may utilize rules set forth by the issuing financial institution 1102 to determine approval or denial of the payment transaction, and may modify the transaction message accordingly prior to forwarding to the acquiring financial institution 1110 in step 1144. The transaction processing server 1112 may retain data associated with transactions for which the transaction processing server 1112 stands in, and may transmit the retained data to the issuing financial institution 1102 once communication is reestablished. The issuing financial institution 1102 may then process transaction accounts accordingly to accommodate for the time of lost communication.

In another example, if the transaction processing server 1112 is unavailable for submission of the authorization request by the acquiring financial institution 1110, then the transaction processor at the acquiring financial institution 1110 may be configured to perform the processing of the transaction processing server 1112 and the issuing financial institution 1102. The transaction processor may include rules and data suitable for use in making a determination of approval or denial of the payment transaction based on the data included therein. For instance, the issuing financial institution 1102 and/or transaction processing server 1112 may set limits on transaction type, transaction amount, etc. that may be stored in the transaction processor and used to determine approval or denial of a payment transaction based thereon. In such instances, the acquiring financial institution 1110 may receive an authorization response for the payment transaction even if the transaction processing server 1112 is unavailable, ensuring that transactions are processed and no downtime is experienced even in instances where communication is unavailable. In such cases, the transaction processor may store transaction details for the payment transactions, which may be transmitted to the transaction processing server 1112 (e.g., and from there to the associated issuing financial institutions 1102) once communication is reestablished.

In some embodiments, transaction processors may be configured to include a plurality of different communication channels, which may utilize multiple communication cards and/or devices, to communicate with the transaction processing server 1112 for the sending and receiving of transaction messages. For example, a transaction processor may be comprised of multiple computing devices, each having multiple communication ports that are connected to the transaction processing server 1112. In such embodiments, the transaction processor may cycle through the communication channels when transmitting transaction messages to the transaction processing server 1112, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 1110 may identify that an authorization request involves an issuing financial institution 1102 (e.g., via the bank identification number included in the transaction message) for which no value-added services are required. The transaction processor at the acquiring financial institution 1110 may then transmit the authorization request directly to the transaction processor at the issuing financial institution 1102 (e.g., without the authorization request passing through the transaction processing server 1112), where the issuing financial institution 1102 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 1112 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 1108, acquiring financial institution 1110, etc.) for processing using this advanced network, and to quickly and efficiently receive a response regarding the ability for a consumer 1104 to fund the payment transaction.

Computer System Architecture

Figure 12:
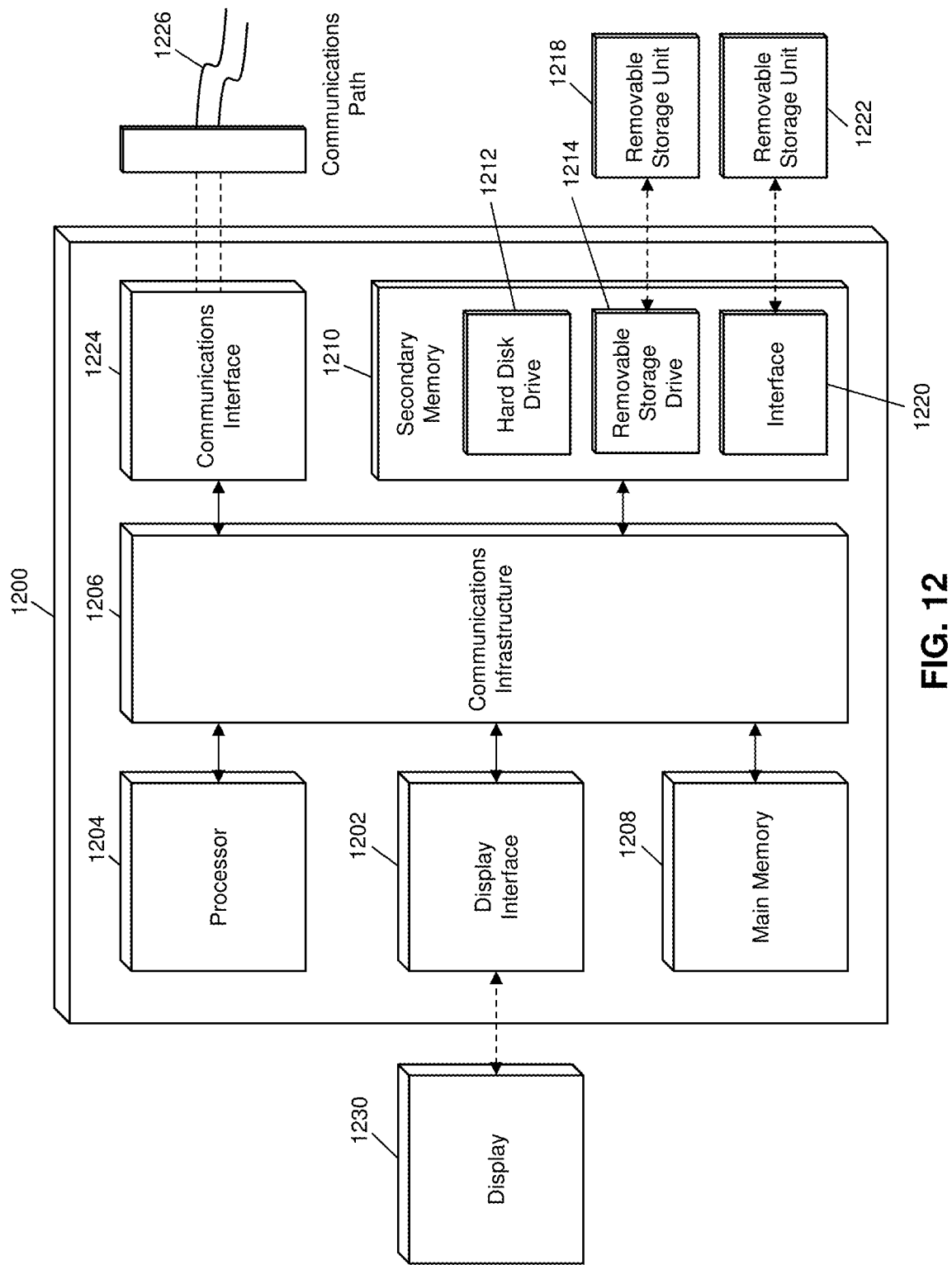
FIG. 12 is a block diagram illustrating a computer system architecture in accordance with exemplary embodiments.

FIG. 12 illustrates a computer system 1200 in which embodiments of the present disclosure, or portions thereof, may be implemented as computer-readable code. For example, the processing server 102 of FIG. 1 may be implemented in the computer system 1200 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A, 3B, 4A, 4B, 5, 6, 7A, 7B, and 8-11.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1218, a removable storage unit 1222, and a hard disk installed in hard disk drive 1212.

Various embodiments of the present disclosure are described in terms of this example computer system 1200. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1204 may be a special purpose or a general purpose processor device. The processor device 1204 may be connected to a communications infrastructure 1206, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1200 may also include a main memory 1208 (e.g., random access memory, read-only memory, etc.), and may also include a secondary memory 1210. The secondary memory 1210 may include the hard disk drive 1212 and a removable storage drive 1214, such as a floppy disk drive, a magnetic tape drive, an optical disk drive, a flash memory, etc.

The removable storage drive 1214 may read from and/or write to the removable storage unit 1218 in a well-known manner. The removable storage unit 1218 may include a removable storage media that may be read by and written to by the removable storage drive 1214. For example, if the removable storage drive 1214 is a floppy disk drive or universal serial bus port, the removable storage unit 1218 may be a floppy disk or portable flash drive, respectively. In one embodiment, the removable storage unit 1218 may be non-transitory computer readable recording media.

In some embodiments, the secondary memory 1210 may include alternative means for allowing computer programs or other instructions to be loaded into the computer system 1200, for example, the removable storage unit 1222 and an interface 1220. Examples of such means may include a program cartridge and cartridge interface (e.g., as found in video game systems), a removable memory chip (e.g., EEPROM, PROM, etc.) and associated socket, and other removable storage units 1222 and interfaces 1220 as will be apparent to persons having skill in the relevant art.

Data stored in the computer system 1200 (e.g., in the main memory 1208 and/or the secondary memory 1210) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1200 may also include a communications interface 1224. The communications interface 1224 may be configured to allow software and data to be transferred between the computer system 1200 and external devices. Exemplary communications interfaces 1224 may include a modem, a network interface (e.g., an Ethernet card), a communications port, a PCMCIA slot and card, etc. Software and data transferred via the communications interface 1224 may be in the form of signals, which may be electronic, electromagnetic, optical, or other signals as will be apparent to persons having skill in the relevant art. The signals may travel via a communications path 1226, which may be configured to carry the signals and may be implemented using wire, cable, fiber optics, a phone line, a cellular phone link, a radio frequency link, etc.

The computer system 1200 may further include a display interface 1202. The display interface 1202 may be configured to allow data to be transferred between the computer system 1200 and external display 1230. Exemplary display interfaces 1202 may include high-definition multimedia interface (HDMI), digital visual interface (DVI), video graphics array (VGA), etc. The display 1230 may be any suitable type of display for displaying data transmitted via the display interface 1202 of the computer system 1200, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1208 and secondary memory 1210, which may be memory semiconductors (e.g., DRAMs, etc.). These computer program products may be means for providing software to the computer system 1200. Computer programs (e.g., computer control logic) may be stored in the main memory 1208 and/or the secondary memory 1210. Computer programs may also be received via the communications interface 1224. Such computer programs, when executed, may enable computer system 1200 to implement the present methods as discussed herein. In particular, the computer programs, when executed, may enable processor device 1204 to implement the methods illustrated by FIGS. 3A, 3B, 4A, 4B, 5, 6, 7A, 7B, and 8-11, as discussed herein. Accordingly, such computer programs may represent controllers of the computer system 1200. Where the present disclosure is implemented using software, the software may be stored in a computer program product and loaded into the computer system 1200 using the removable storage drive 1214, interface 1220, and hard disk drive 1212, or communications interface 1224.

The processor device 1204 may comprise one or more modules or engines configured to perform the functions of the computer system 1200. Each of the modules or engines may be implemented using hardware and, in some instances, may also utilize software, such as corresponding to program code and/or programs stored in the main memory 1208 or secondary memory 1210. In such instances, program code may be compiled by the processor device 1204 (e.g., by a compiling module or engine) prior to execution by the hardware of the computer system 1200. For example, the program code may be source code written in a programming language that is translated into a lower level language, such as assembly language or machine code, for execution by the processor device 1204 and/or any additional hardware components of the computer system 1200. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 1200 to perform the functions disclosed herein. It will be apparent to persons having skill in the relevant art that such processes result in the computer system 1200 being a specially configured computer system 1200 uniquely programmed to perform the functions discussed above.

Techniques consistent with the present disclosure provide, among other features, systems and methods verification of user identity. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for verification of user identity, comprising:
  storing, in an account database of a processing server, a plurality of account profiles, each account profile including data related to a user account of a non-financial institution (NFI) entity, wherein (i) said data includes at least an account identifier and an address, and (ii) said NFI entity is internet-centric;

receiving, by a receiving device of the processing server, from said NFI entity, a transaction request, wherein the transaction request includes at least a transaction amount and a specific account identifier associated with a specific user account of a specific user;

identifying, by a processing device of the processing server, a specific account profile from the plurality of account profiles stored in the account database where the account identifier included in the data of the specific account profile corresponds to the specific account identifier included in the transaction request received from the NFI entity;

generating, by the processing device of the processing server, a controlled payment number (CPN) that has a spending limit, prior to identity verification, that is zero, and linking the generated CPN to a transaction account of the NFI entity;

transmitting, by a transmitting device of the processing server, a notification to a third party entity requesting identity verification, wherein the notification includes at least the specific account identifier included in the transaction request received from the NFI entity;

transmitting, by the transmitting device of the processing server, the generated CPN to the specific user associated with the specific user account related to the specific account profile identified by the processing device;

receiving, by the receiving device of the processing device, a data message from the third party entity, wherein the data message includes identity verification information including at least the specific account identifier and identification data associated with the user;

upon receiving the data message from the third party entity, increasing, by the processing device, of the processing server, the spending limit associated with the generated CPN from zero to an amount equivalent to the transaction amount included in the transaction request received from the NFI entity; and updating, by the processing device, of the processing server, the specific account profile in the account database to include at least the generated CPN, the identification data received from the third party entity, and the increased spending limit, wherein future payment transactions involving the CPN are subject to the increased spending limit.

2. The method of claim 1, wherein transmitting the generated CPN includes electronically transmitting the generated CPN to a mobile device associated with the address included in the data of the specific account profile identified by the processing device.

3. The method of claim 1, wherein the generated CPN is transmitted to a payment card engine configured to encode the generated CPN in a physical payment card for distribution to the user using the address included in the data of the specific account profile identified by the processing device.

4. The method of claim 1, wherein the identification data includes at least one of: an identification number, name, date of birth, age, gender, signature, image, and biometric data.

5. The method of claim 1, further comprising:
transmitting, by the transmitting device, at least the identification data and the specific account identifier to a financial institution associated with the transaction account of the NFI entity.

6. The method of claim 5, further comprising:
receiving, by the receiving device, a verification from the financial institution, wherein the verification includes at least the specific account identifier and an indication of verification of the identification data.

7. The method of claim 6, wherein the verification is received from the financial institution prior to updating the specific account profile.

8. The method of claim 1, wherein
the address included in the data of the specific account profile identified by the processing device is associated with a geographic area, and
the third party entity is associated with the geographic area.

9. A system for verification of user identity, comprising:
an account database, of a processing server, configured to store a plurality of account profiles, each account profile including data related to a user account of a non-financial institution (NFI) entity, wherein (i) said data includes at least an account identifier and an address, and (ii) said NFI entity is internet-centric;
a receiving device, of a processing server, configured to receive, from said NFI entity, a transaction request, wherein the transaction request includes at least a transaction amount and a specific account identifier associated with a specific user account of a specific user;
a processing device, of a processing server, configured to
identify a specific account profile stored in the account database where the account identifier included in the specific account profile corresponds to the specific account identifier included in the transaction request received from the NFI entity, and
generate a controlled payment number (CPN) that has a spending limit, prior to identity verification, that is zero, and
link the generated CPN to a transaction account of the NFI entity; and
a transmitting device, of the processing server, configured to transmit
a notification to a third party entity requesting identity verification, wherein the notification includes at least the specific account identifier included in the transaction request received from the NFI entity, and
the generated CPN to the specific user associated with the specific user account related to the specific account profile identified by the processing device,
wherein
the receiving device is further configured to receive a data message from the third party entity, wherein the data message includes identity verification information including at least the specific account identifier and identification data associated with the specific user, and
the processing device, of the processing device, upon receiving the data message from the third party entity, is further configured to (i) increase the spending limit associated with the generated CPN from zero to an amount equivalent to the transaction amount included in the transaction request received from the NFI entity, and (ii) update the specific account profile in the account database to include at least the generated CPN, the identification data received from the third party entity, and the increased spending limit, wherein future payment transactions involving the CPN are subject to the increased spending limit.

10. The system of claim 9, wherein transmitting the generated CPN includes electronically transmitting the generated CPN to a mobile device associated with the address included in the data of the specific account profile identified by the processing device.

11. The system of claim 9, wherein the generated CPN is transmitted to a payment card engine configured to encode the generated CPN in a physical payment card for distribution to the user using the address included in the data of the specific account profile identified by the processing device.

12. The system of claim 9, wherein the identification data includes at least one of: an identification number, name, date of birth, age, gender, signature, image, and biometric data.

13. The system of claim 9, wherein the transmitting device is further configured to transmit at least the identification data and the specific account identifier to a financial institution associated with the transaction account of the NFI entity.

14. The system of claim 13, wherein the receiving device is further configured to receive a verification from the financial institution, wherein the verification includes at least the specific account identifier and an indication of verification of the identification data.

15. The system of claim 14, wherein the verification is received from the financial institution prior to updating the specific account profile.

16. The system of claim 9, wherein
the address included in the data of the specific account profile identified by the processing device is associated with a geographic area, and
the third party entity is associated with the geographic area.

* * * * *